US011573974B2

(12) United States Patent
Vasireddy et al.

(10) Patent No.: US 11,573,974 B2
(45) Date of Patent: Feb. 7, 2023

(54) SYSTEM AND METHOD FOR AUTOMATIC CORRECTION/REJECTION IN AN ANALYSIS APPLICATIONS ENVIRONMENT

(71) Applicant: ORACLE INTERNATIONAL CORPORATION, Redwood Shores, CA (US)

(72) Inventors: Gunaranjan Vasireddy, Hyderabad (IN); Jagan Narayanareddy, Pleasanton, CA (US); Sai Rajendra Vadakattu, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/852,065

(22) Filed: Apr. 17, 2020

(65) Prior Publication Data
US 2020/0334268 A1   Oct. 22, 2020

(30) Foreign Application Priority Data

Apr. 18, 2019  (IN) .............................. 201941015559

(51) Int. Cl.
*G06F 16/25*    (2019.01)
*G06N 5/02*    (2006.01)
*G06F 16/215*   (2019.01)
*G06F 16/21*    (2019.01)

(52) U.S. Cl.
CPC .......... *G06F 16/254* (2019.01); *G06F 16/211* (2019.01); *G06F 16/215* (2019.01); *G06N 5/02* (2013.01)

(58) Field of Classification Search
CPC ...... G06F 16/23; G06F 16/254; G06F 16/215; G06F 16/211; G06N 5/02
See application file for complete search history.

(56) References Cited

U.S. PATENT DOCUMENTS

| | | | |
|---|---|---|---|
| 10,360,231 B2 | 7/2019 | Hyde | |
| 2013/0151491 A1* | 6/2013 | Gislason | G06F 16/2282 707/696 |
| 2014/0344778 A1* | 11/2014 | Lau | G06F 16/211 717/106 |
| 2017/0011087 A1 | 1/2017 | Hyde | |
| 2017/0371926 A1* | 12/2017 | Shiran | G06F 16/24524 |
| 2019/0171650 A1* | 6/2019 | Botev | G06F 16/2358 |
| 2019/0278938 A1* | 9/2019 | Greene | H04L 41/40 |
| 2020/0250172 A1* | 8/2020 | Busjaeger | G06F 16/24552 |

OTHER PUBLICATIONS

Oracle, "Fusion Middlewear Developing Integration Projects with Oracle Data Integrator 12c (12.2.1.1)", May 2016, 340 pages.
Oracle, "Fusion Middlewear Developing Integration Projects with Oracle Data Integrator—Overview of Oracle Data Integrator Topology", 4 pages, retrieved on Oct. 20, 2022 from: <https://docs.oracle.com/middlewear/12211/odi/develop/setup_topology.htm#ODIDG171>.

* cited by examiner

*Primary Examiner* — Amresh Singh
*Assistant Examiner* — Courtney Harmon
(74) *Attorney, Agent, or Firm* — Tucker Ellis LLP

(57) ABSTRACT

Systems and methods for automatic error rejection are provided. Systems and methods described herein bypass the creation of a staging table at the outset and, instead, attempt a direct merge from a source data location to a target data location. In the event that the merge fails, then a temporary/staging table can be loaded where errors can be logged, validations can be performed, and erroneous data can be corrected.

20 Claims, 16 Drawing Sheets

SYSTEM AND METHOD FOR AUTOMATIC CORRECTION/REJECTION IN AN ANALYSIS APPLICATIONS ENVIRONMENT

CLAIM OF PRIORITY AND CROSS REFERENCE TO RELATED APPLICATIONS

This application claims the benefit of priority to Indian Patent Application No. 201941015559 entitled "SYSTEM AND METHOD FOR AUTOCORRECTION/REJECTION IN AN ANALYTICS ENVIRONMENT", filed on Apr. 18, 2019, which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and business intelligence, and are particularly related to systems and methods for providing an application analytics environment that enables the development of software analytic applications.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In traditional systems, extract, transform, and load processes can be burdensome on the users and/or administrators to manage. This is due to the possibility of ETL failing whenever there is bad data within the source. Systems and frameworks have been developed that allow ETLs to continue unabated, or correct erroneous/bad data in the source that would prevent ETLs from failing, but these have costs associated with them. As well, such fixes generally require the use of a temporary table so that the user/administrator running the ETL can perform checks on the tables and then load the valid records to the target. Such processes are time and resource intensive, and thus undesirable.

SUMMARY

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

Described herein are systems and methods for automatic correction/rejection in an analytic applications environment. An exemplary method can provide, at an application analytics environment, a data plane comprising a server, a data warehouse, the data warehouse comprising a provisioned tenant schema associated with a tenant, and a data integrator provided at the data plane. The method can extract a data set, the data set being associated with the tenant. The method can upon extraction of the data set, check the data set for duplicate entries, wherein upon finding one or more duplicate entries, one or more of duplicate entries are removed from the extracted data set. The method can associate the data integrator with a plurality of knowledge models stored at an accessible memory. The method can receive, at the data integrator, the extracted data set. The method can initiate, at the data integrator, a first operation, the first operation being controlled by a first knowledge module of the plurality of knowledge modules, the first knowledge module comprising instructions for a merge operation. The method can upon the first operation failing, initiate, at the data integrator, a second operation, the second operation being controlled by a second knowledge module of the plurality of knowledge modules, the second knowledge module comprising instructions for an incremental update operation.

In accordance with an embodiment, each of the plurality of knowledge models can comprise metadata instructions, wherein the metadata instructions of the first knowledge module comprise instructions to perform the merge operation. The metadata instructions of the second knowledge module can comprise instructions to perform the incremental update operation.

In accordance with an embodiment, the metadata instructions to perform the merge operation can cause the data integrator to perform an ETL process that directly merges the extracted data set to the provisioned tenant schema associated with the tenant at the data warehouse.

In accordance with an embodiment, the metadata instructions to perform the incremental update can include instructions that cause the data integrator to initiate and provision a staging table accessible by the data integrator. The metadata instructions to perform the incremental update can include further instructions that cause the data integrator to transfer the extracted data set to a temporary table. The metadata instructions to perform the incremental update can include further instructions that cause the data integrator to check the extracted data set at the temporary table against a constraints field. The metadata instructions to perform the incremental update can include further instructions that cause the data integrator to remove to the staging table any member of the extracted data set that fails check against the constraints filed.

In accordance with an embodiment, the metadata instructions to perform the incremental update can include further instructions that cause the data integrator to commit to the provisioned tenant schema at the data warehouse other member of the extracted data set that passes the check against the constraints field to the target. The metadata instructions to perform the incremental update can include further instructions that cause the data integrator to accept inputs indicative of instructions to correct a member of the extracted data set at the staging table.

In accordance with an embodiment, upon correcting the member of the extracted data set at the staging table, the metadata instructions to perform the incremental update can include further instructions that cause the data integrator to commit to the provisioned tenant schema at the data warehouse the corrected member of the extracted data set.

DETAILED DESCRIPTION

Figure 1:
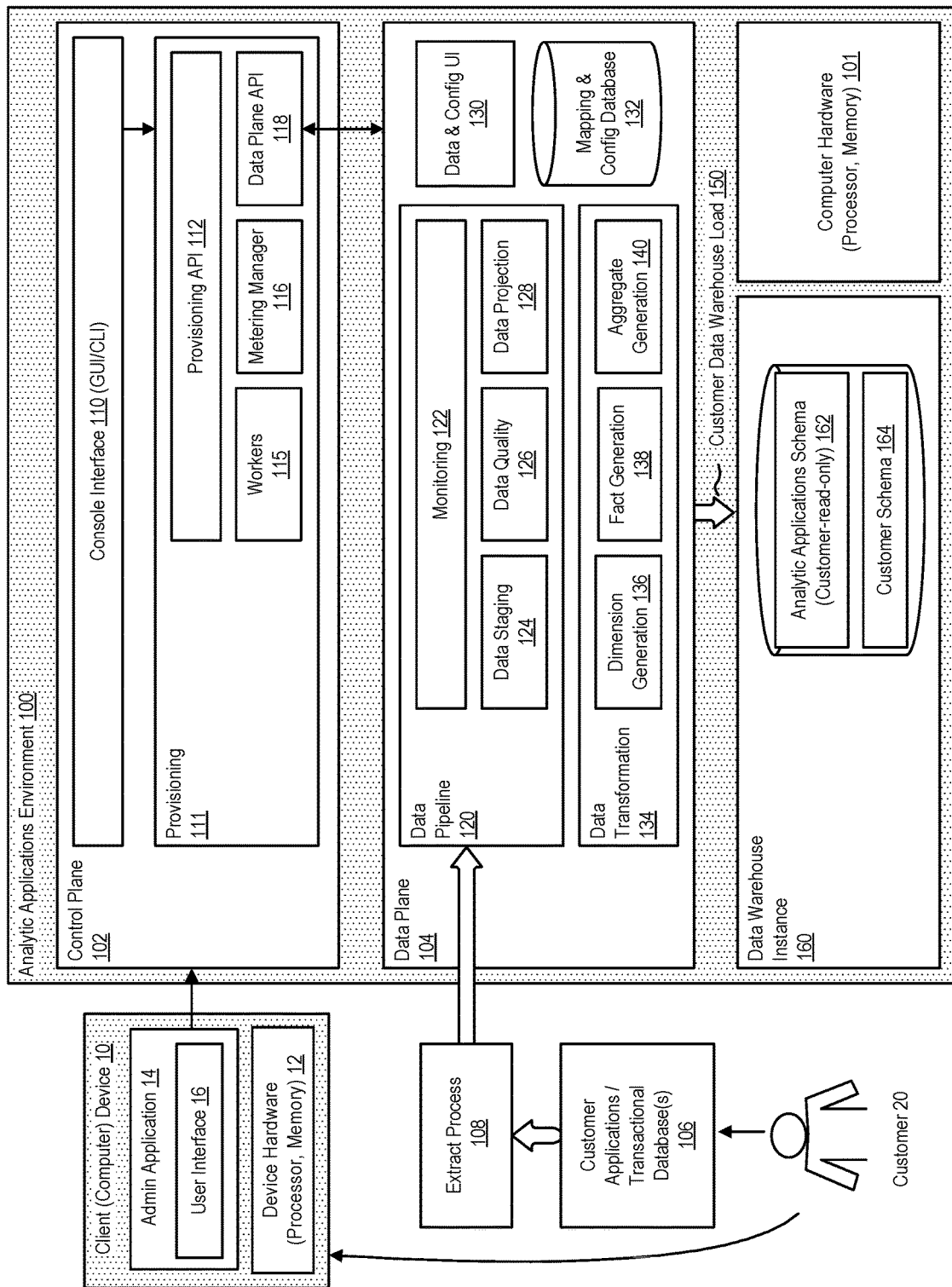
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse component, such as, for example an Oracle Autonomous Data Warehouse Cloud (ADWC) environment, or other type of data warehouse component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an ADWC tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example an Oracle Autonomous Data Warehouse Cloud (ADWC) environment, or other type of data warehouse component adapted to store large amounts of data, can provide a central repository for storage of data collected by one or more business applications.

For example, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example an Oracle Business Intelligence Applications (OBIA) environment, or other type of BI component adapted to examine large amounts of data sourced either by the customer (tenant) itself, or from multiple third-party entities.

For example, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, the analytic applications environment can be used to pre-populate a reporting interface of a data warehouse instance with relevant metadata describing business-related data objects in the context of various business productivity software applications, for example to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

The components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example an Oracle Analytics Cloud or Oracle Cloud Infrastructure environment, or other type of cloud environment.

For example, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, the provisioning component can be accessed and utilized, via the console interface, by a customer (tenant) to purchase one or more of a suite of business productivity software applications, together with a data warehouse instance for use with those software applications.

A customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

The provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, provisioning and configuration changes directed to services provided by the data plane can be communicated to the data plane via the data plane API.

In accordance with an embodiment, the metering manager can include various functionality that meters services and usage of services provisioned through control plane.

For example, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

To support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

Data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
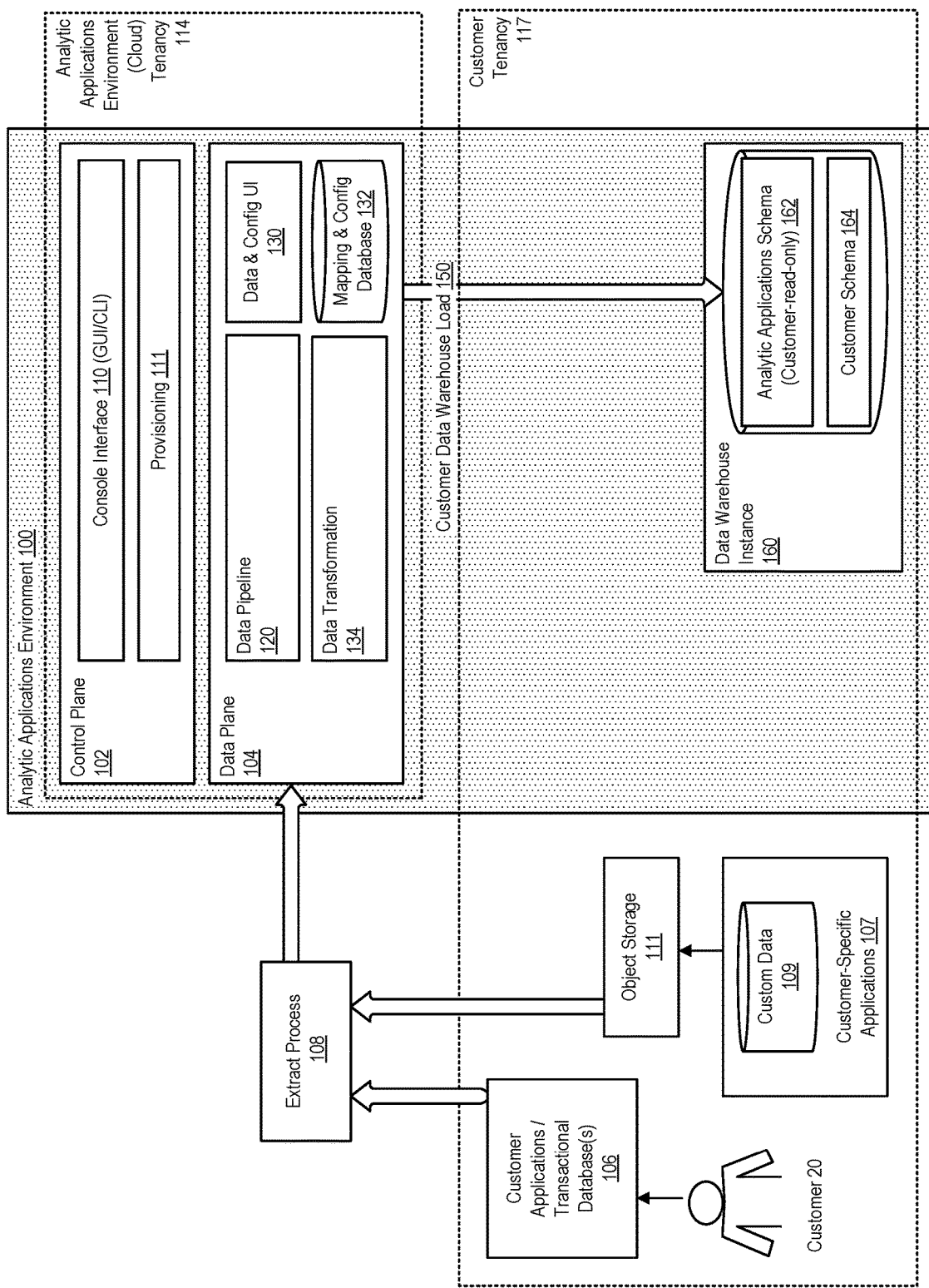
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

For a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
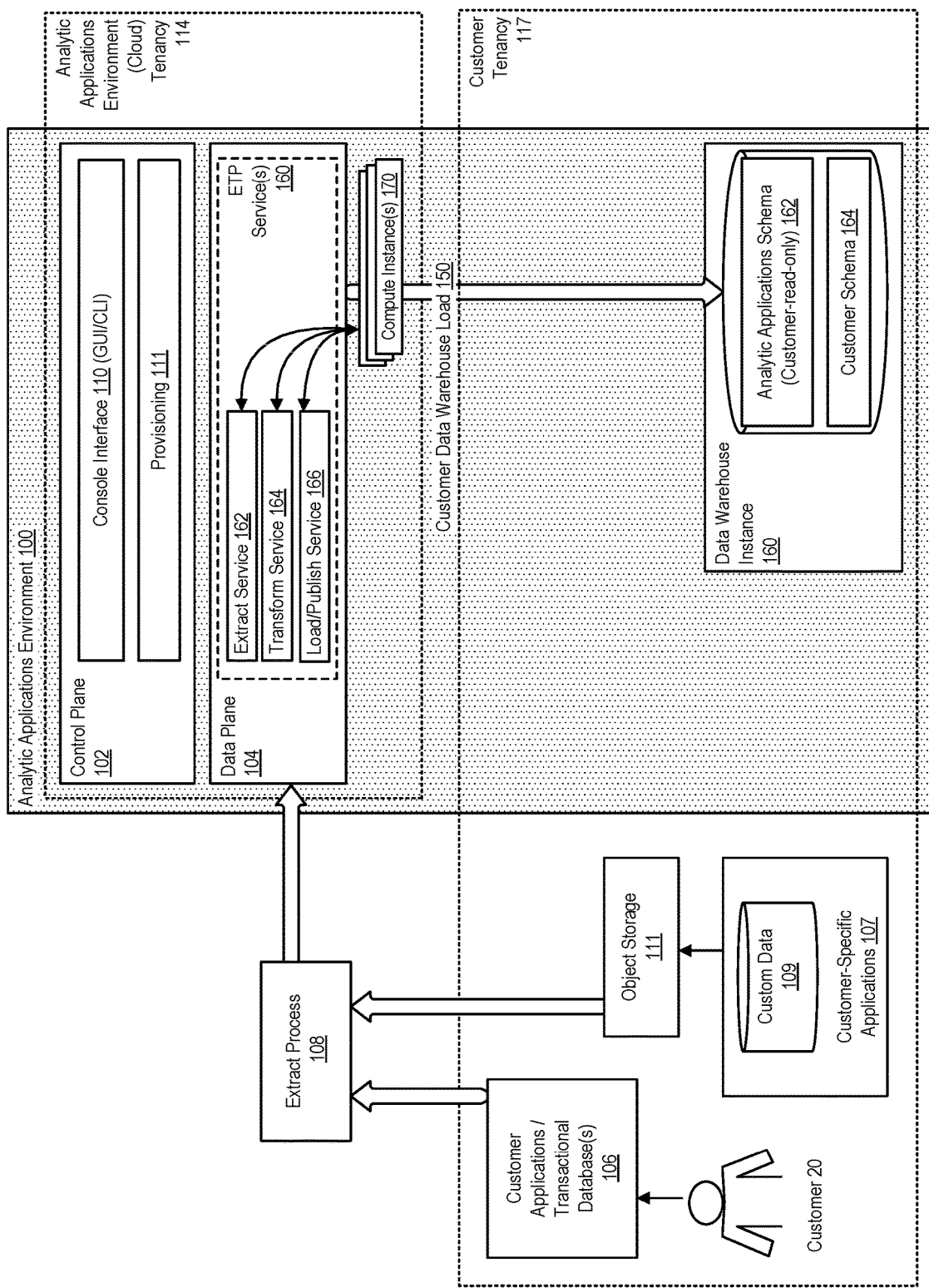
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, for example an Oracle Storage Service (OSS) component, for storage of the data.

Transformation: In accordance with an embodiment, the transformation process takes the data files from object storage component (e.g., OSS), and applies a business logic while loading them to a target data warehouse, e.g., ADWC database, which is internal to the data pipeline or process, and is not exposed to the customer (tenant).

Load/Publish: In accordance with an embodiment, a load/publish service or process takes the data from the, e.g., IADW warehouse, and publishes it to a data warehouse instance that is accessible to the customer (tenant).

Multiple Customers (Tenants)

Figure 4:
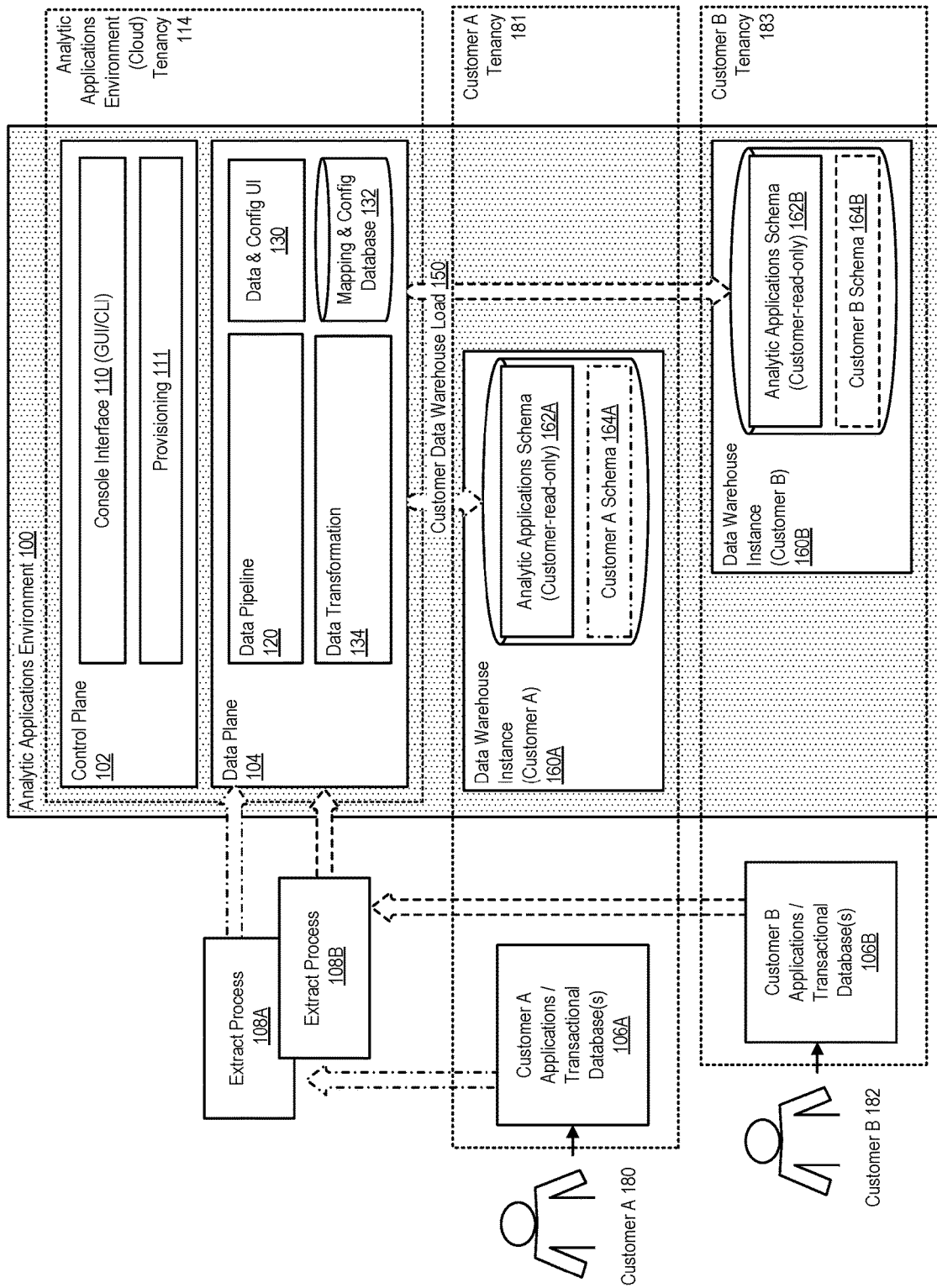
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

For each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema 164A, 164B that is readily modifiable by the customer, and which allows the customer to supplement and utilize the data within their own data warehouse instance.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
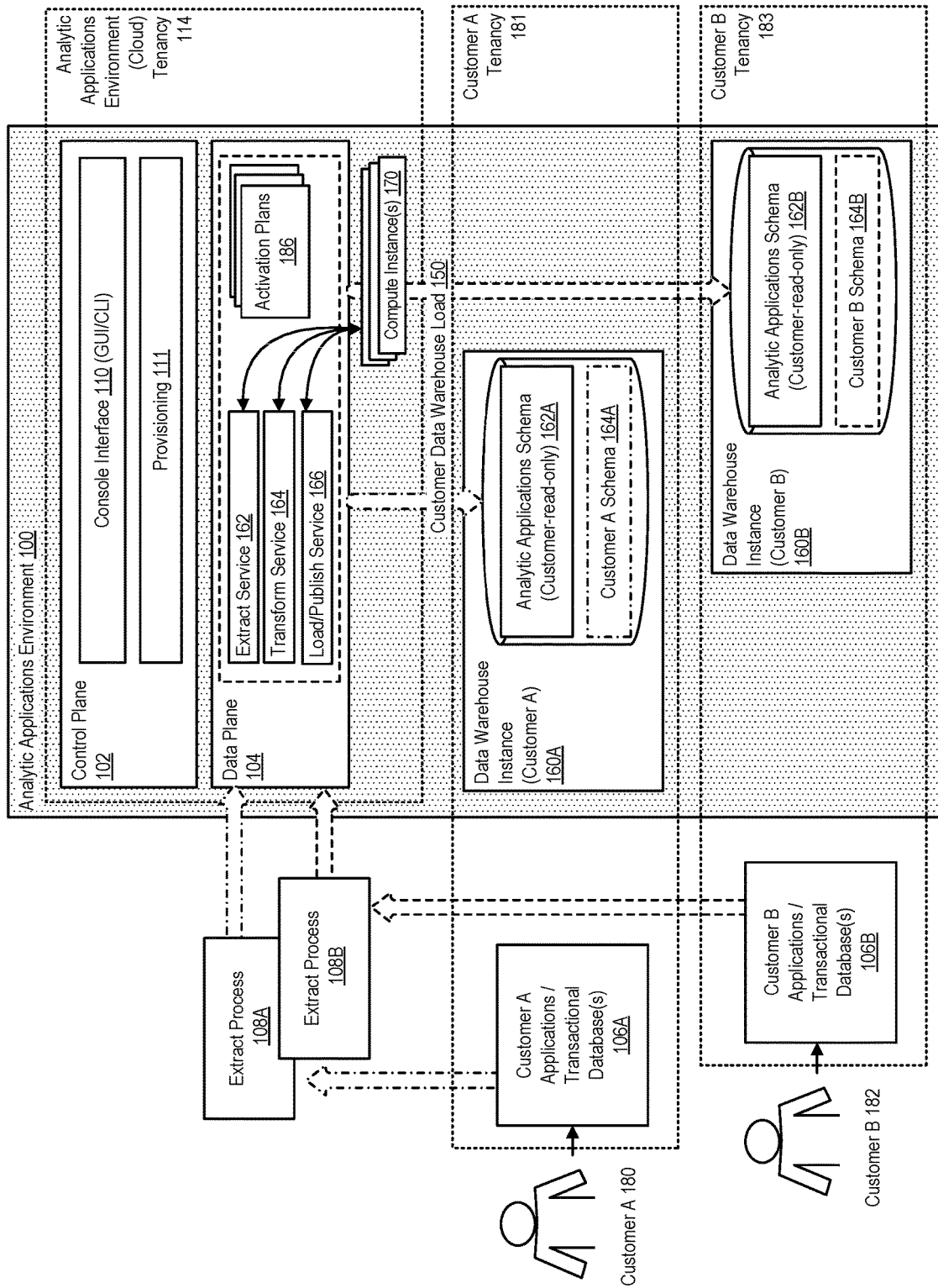
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, an activation plan can define a number of extract, transform, and load (publish) services or steps to be run in a certain order, at a certain time of day, and within a certain window of time.

Each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
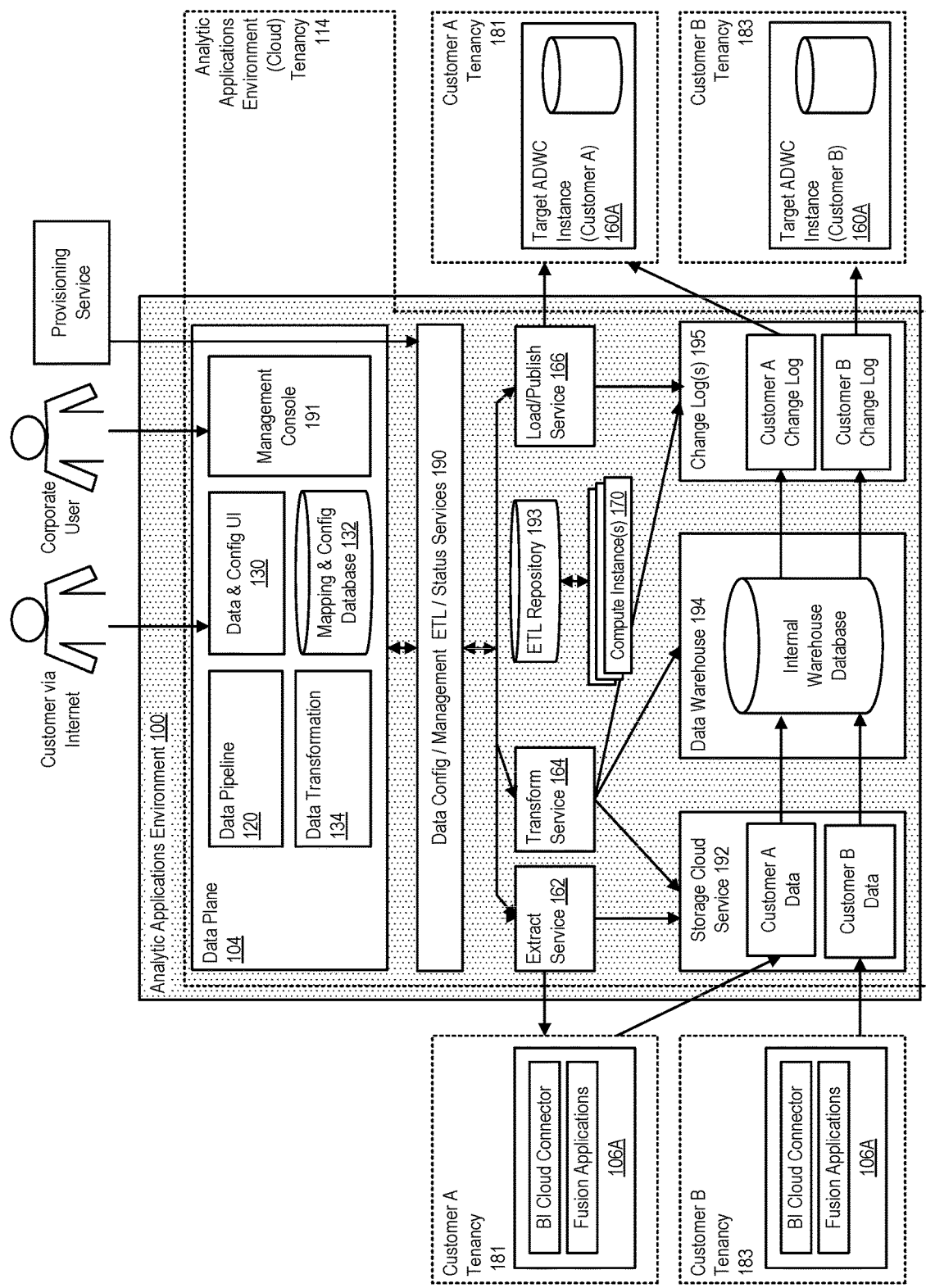
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETL/ /status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., IADW) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
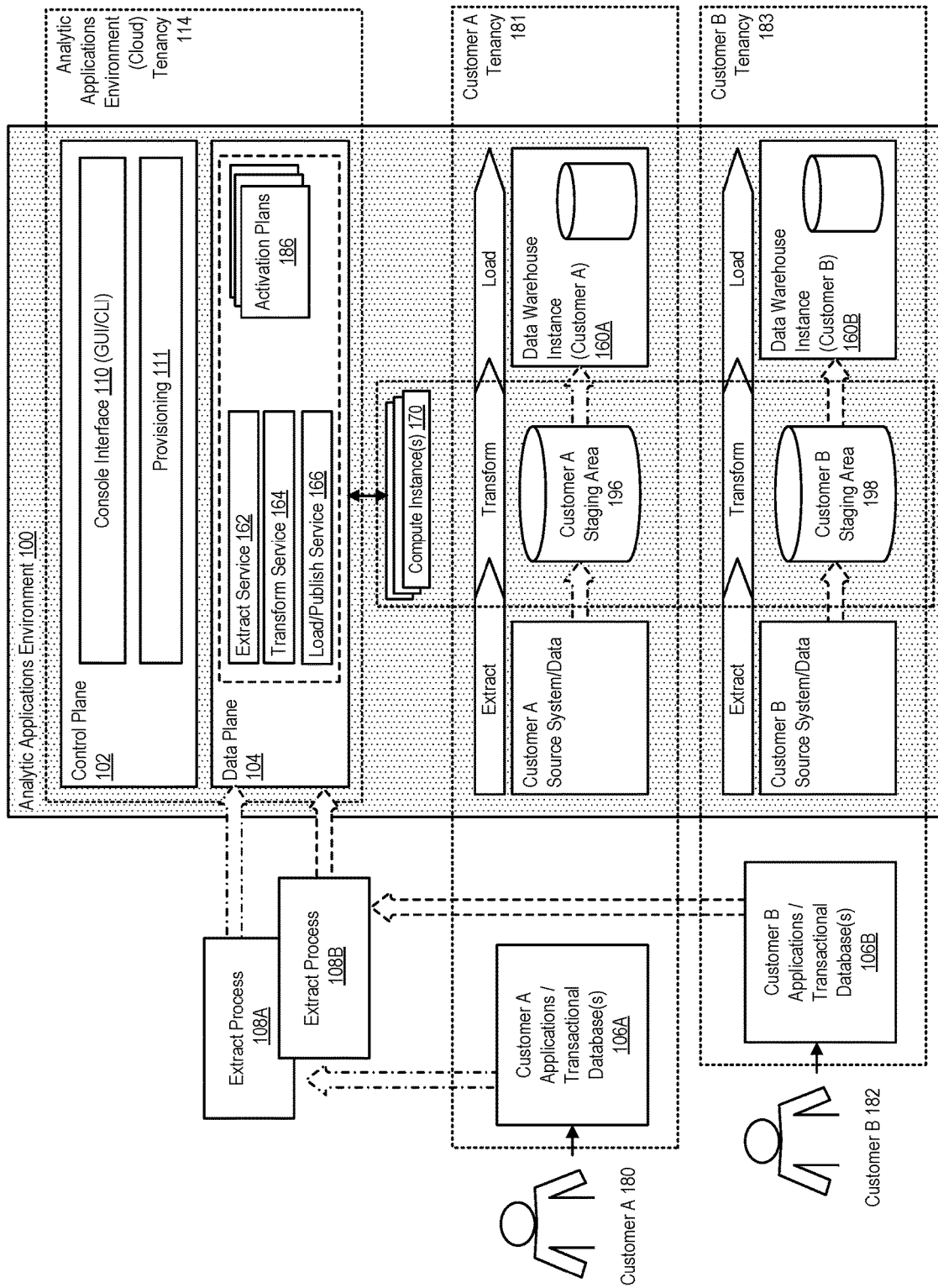
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
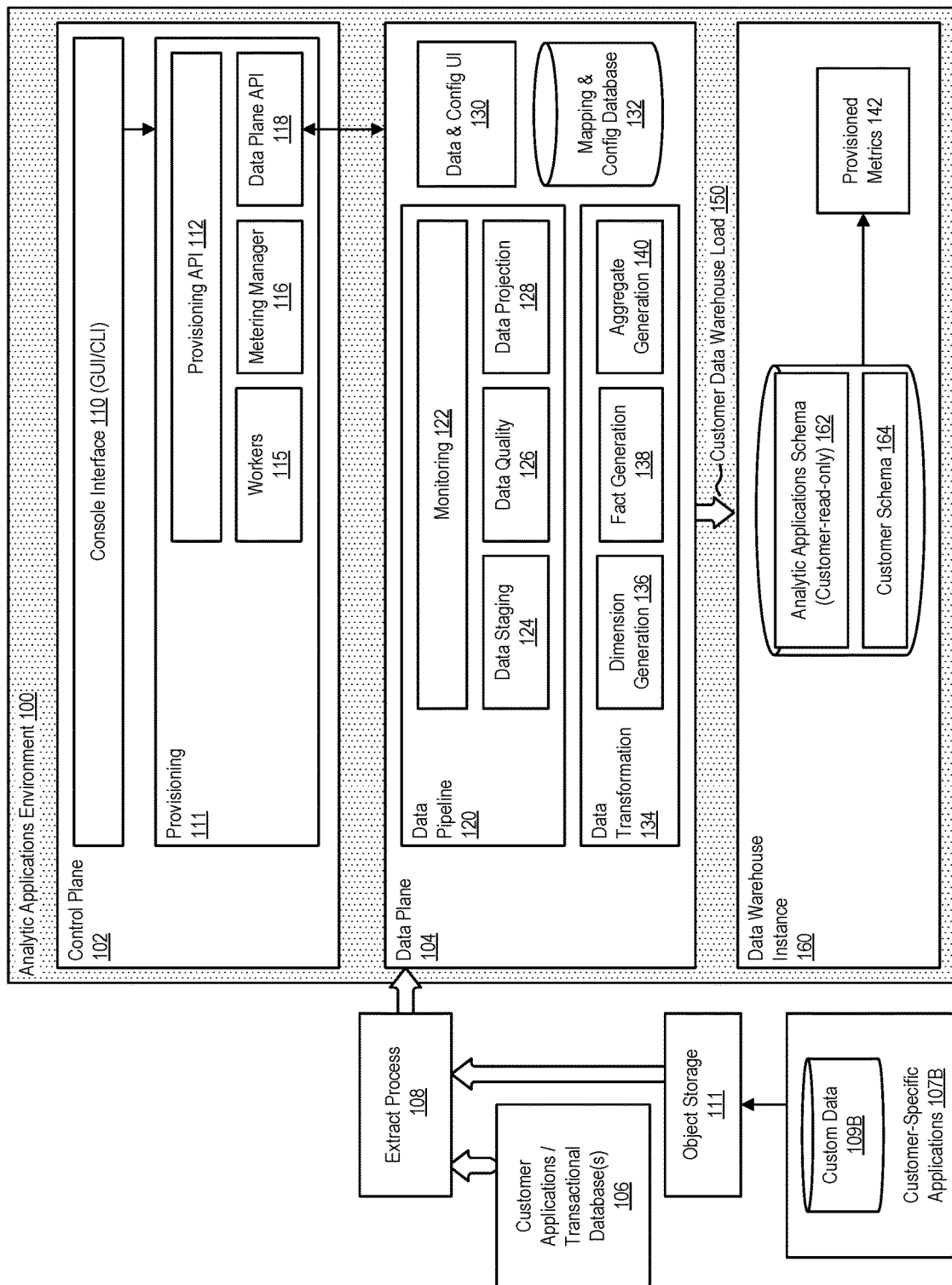
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
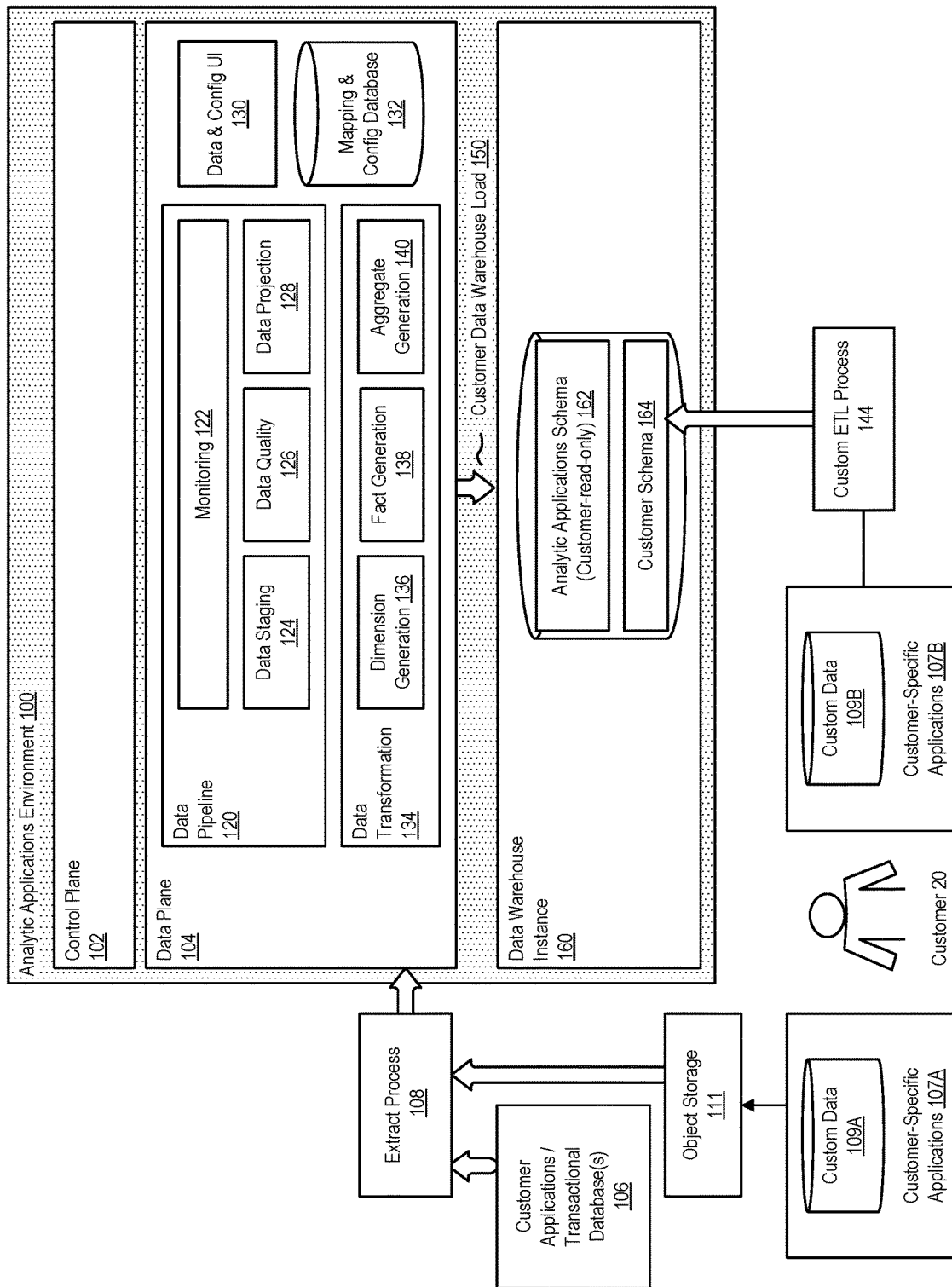
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
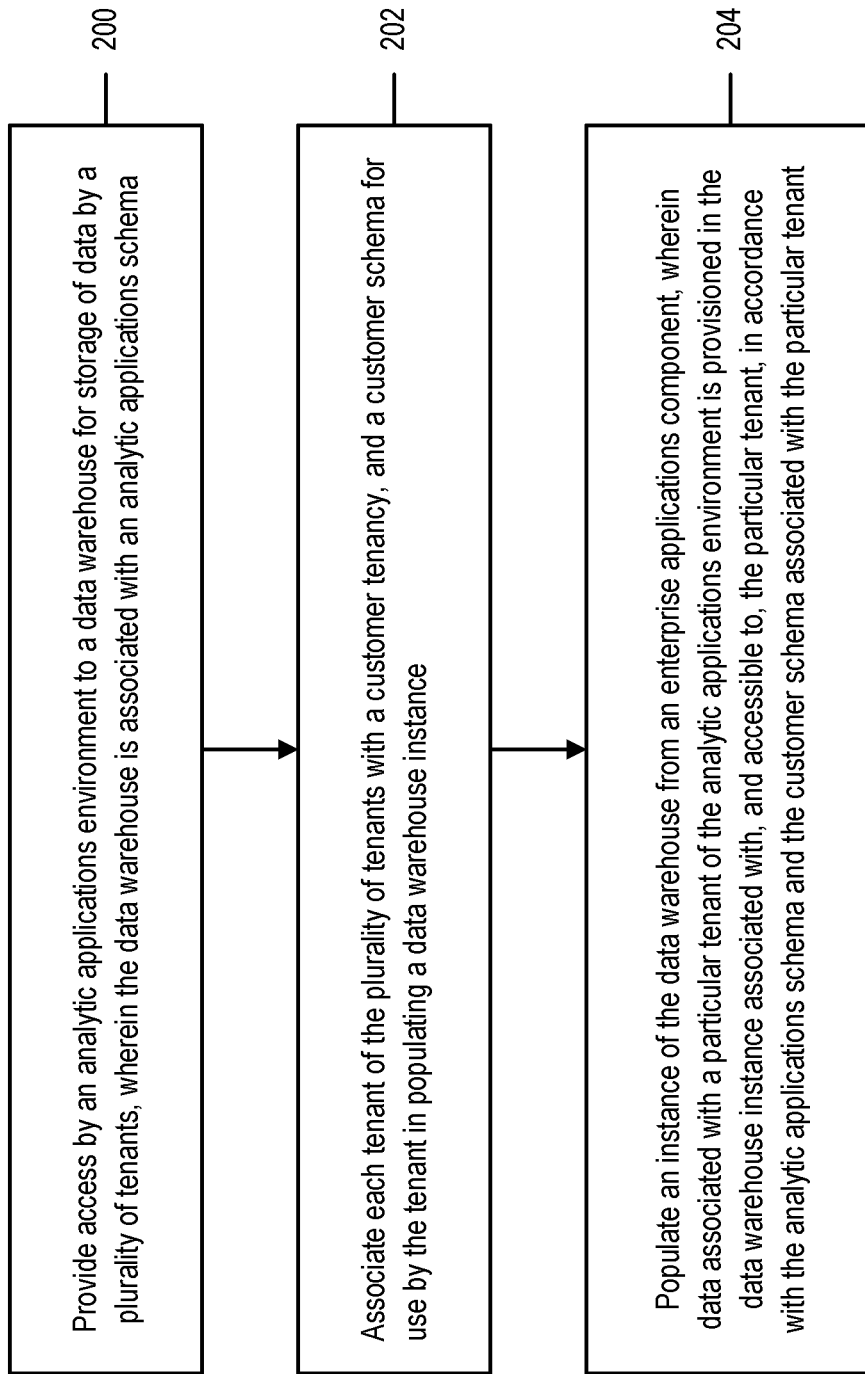
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Auto Correction/Rejection during ETL

In accordance with an embodiment, in traditional systems, extract, transform, and load processes can be burdensome on the users and/or administrators to manage. This is due to the possibility of ETL failing whenever there is bad data within the source. Systems and frameworks have been developed that allow ETLs to continue unabated, or correct erroneous/bad data in the source that would prevent ETLs from failing, but these have costs associated with them. As well, such fixes generally require the use of a temporary table so that the user/administrator running the ETL can perform checks on the tables and then load the valid records to the target. Such processes are time and resource intensive, and thus undesirable.

In accordance with an embodiment, other systems and methods have been developed for use of an auto-correction framework. In such systems, a mapping is run initially without the use of validations. If the initial mapping fails, then the systems can automatically re-run the mapping with all of the validations in place. Such methods ensure that validations are only run when there are failures, and not run every time an ETL is performed.

In accordance with an embodiment, the systems and methods described herein bypass the creation of a staging table at the outset and, instead, initially perform a direct merge from a source data location to a target data location. In the event that the merge fails, then a temporary/staging table can be loaded where errors can be logged, validations can be performed, and erroneous data can be corrected.

Figure 11:
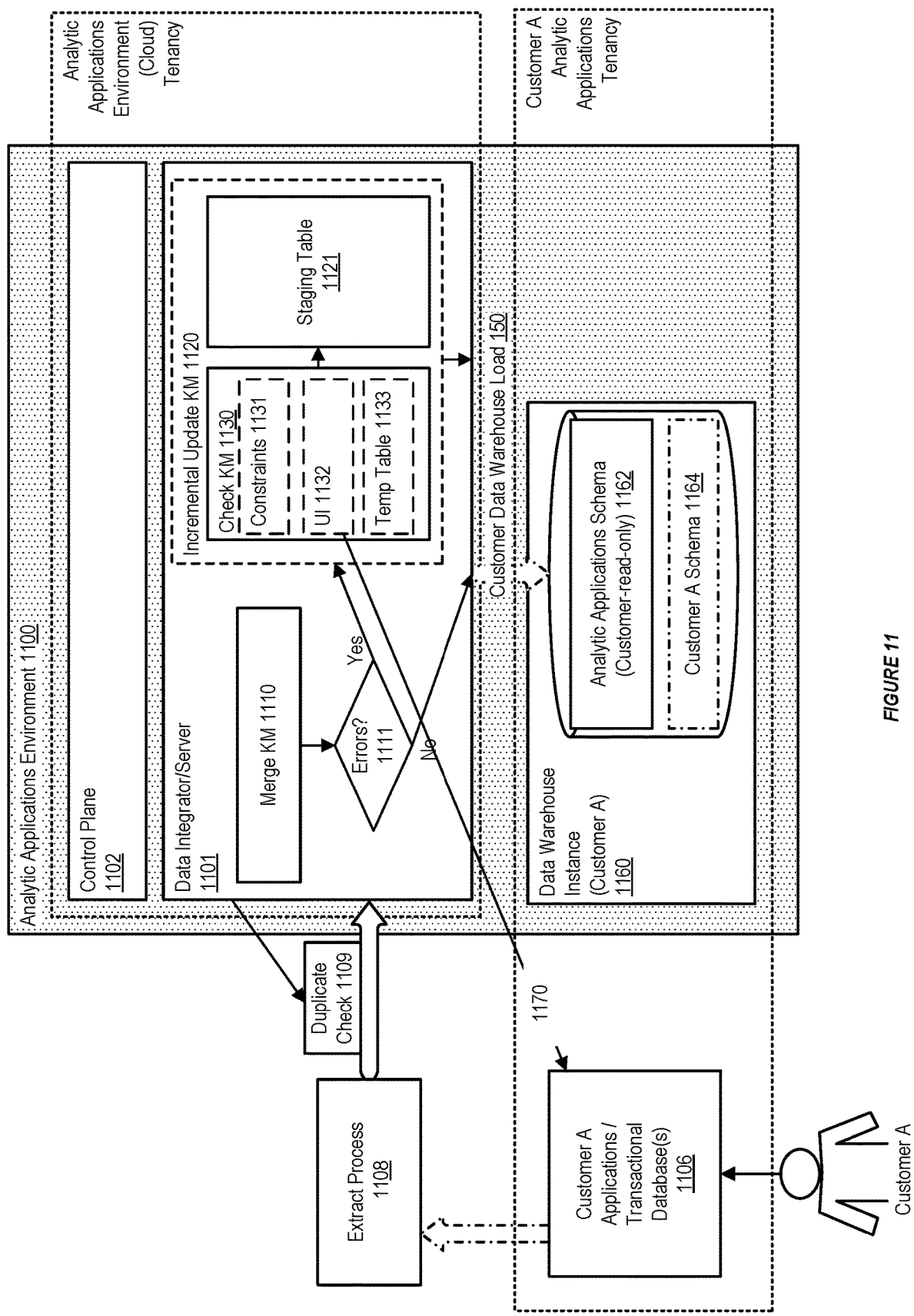
FIG. 11 illustrates a system for automatic correction/rejection in an analytics environment, in accordance with an embodiment.

FIG. 11 illustrates a system for automatic correction/rejection in an analytics environment, in accordance with an embodiment.

As illustrated in FIG. 11, a control plane 1102 provides control, e.g., for cloud products offered within a SaaS environment; and can include a console interface, that enables access by a client (computer) device under control of a customer/tenant; and a provisioning component, as shown in the figures above.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

As further illustrated in FIG. 11, a data integrator/server 1101 can be provided at, for example, the data plane as described in FIG. 1. This data integrator can be, in some embodiments, be thought to comprise a data pipeline (e.g., an extract, transform, load (ETL) process and a data transformation layer, which together operate to extract 1108, process, and load 1150 the data to a data warehouse. Such data can include data from operational or transactional data from customer enterprise applications or transaction database environments 1106, e.g., Oracle Fusion Applications environments, into data warehouse instances.

In accordance with an embodiment, the data pipeline maintains, for each customer/tenant (e.g., customer A associated with customer A applications/transactional database 1106), an analytic applications schema 1162, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1106.

In accordance with an embodiment, as such, the analytic applications schema maintained by the system enables data to be retrieved, by the data pipeline, from the customer's environment, and loaded to the customer's data warehouse instance 1160, in a "live" manner; but is otherwise made accessible to customers in a read-only manner, and is not directly modifiable by the customer.

In accordance with an embodiment, the analytic applications environment also provides, for each customer of the environment, a customer schema, such as 1164, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics.

In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

In accordance with an embodiment, the data integrator 1101 can be provided (e.g., within or associated with the data plane of FIG. 1). Such a data integrator can allow users or administrators to create a logical design which is platform and technology independent. Such logical definitions/designs provided a framework for how data can flow from one system to another. Such data integration tools use such frameworks, in conjunction with the infrastructure in place, to create plans for ETL.

In accordance with an embodiment, the data integrator 1101 can be associated with one or more knowledge modules of a plurality of knowledge modules. Knowledge Modules (KMs) can comprise code templates or knowledge models. Each KM can be dedicated to an individual task in an overall data integration process.

In accordance with an embodiment, each KM can be reused across several interfaces or models (e.g., differing types of source and/or target databases or data warehouses). To modify the behavior of hundreds of jobs using hand-coded scripts and procedures, developers would need to modify each script or procedure. In contrast, the benefit of a KM is that users make a change once and it can be instantly propagated to hundreds of transformations. KMs are based on logical tasks that will be performed. KMs do not contain references to physical objects (data stores, columns, physical paths, etc.)

In accordance with an embodiment, KMs rely on metadata from interfaces, data stores, data warehouses and models in order to run. Such metadata can provide instructions to, for example, the data integrator on which steps to take to run associated operations, such as merge, or incremental update.

In accordance with an embodiment, in order to maximize the success rate of the methods and systems described herein, the data integrator 1101 can, at the outset of a ETL, and after the extraction process 1108 from business production application/DB instance 1106 and loading it to a customer schema 1164 at the data warehouse 1160, check for and remove duplicate data entries 1109 that would cause an ETL process to fail. This is generally a lightweight operation.

In accordance with an embodiment, this duplicate record check and removal process performed after extraction can increase the likelihood of success of the initial load performed with knowledge module-merge 1110.

In accordance with an embodiment, if the ETL process is a full load, the system can optionally disable unique constrains on the target table in order to speed up the ETL process. This can be performed as a way of increasing the speed of the initial run. However, the removal of constraints is only performed after the removal of duplicate records at the source so as to prevent duplicate records being loaded to the customer schema at the data warehouse.

In accordance with an embodiment, the data, with duplicates removed, can then be loaded to the customer schema at the data warehouse via a merge operation, which is provided by a knowledge module 1110 that comprises methods to merge the data directly from the source to the target. In embodiments, the merge knowledge module can load the data directly without use of any flow or staging tables.

In accordance with an embodiment, during this initial phase of the ETL process, a staging area/table 1121 is not started or populated with data form the source 1106. This is because the knowledge module merge 1110 does not require such a staging table as it merely transforms data from the source and directly loads it to the target, in this case the customer schema 1164. By removing the necessity of the creating of a staging area/table, such systems and methods improve the efficiency and performance of ETL processes to take data from source DB instance 1106 and load the data at the target, e.g., customer schema 1164.

In accordance with an embodiment, in situations where no errors 1111 result from the knowledge module merge 1110 process, data is merged directly from the source and loaded at the target.

In accordance with an embodiment, however, if an error does present during the ETL process associated with the knowledge module merge 1110, then a secondary knowledge module-incremental update 1120 can be triggered. This is provided for as the data integrator 1101 can support multiple knowledge module schemas that can run concurrently/simultaneously.

In accordance with an embodiment, an error can result during the merge operation due to, for examples, duplicate records that were not caught during the initial check and removal of duplicate records 1109. Another example of an error that could result in the merge 1110 operation failing is a length issue. For example, if the target table at the customer schema comprises a column with a character limitation (e.g., 30 characters), and a data that is attempted to be loaded within the column with the character limitation comprises 32 characters, then an error will result in the merge operation and the data is not committed at the customer schema. Instead, the entire load is backed out to the knowledge module-incremental update 1120.

In accordance with an embodiment, once triggered by an error in the initial load via the knowledge module merge 1110, the knowledge module incremental update 1120 can start and initialize a check knowledge module (CKM) 1130 and temporary table/staging table 1121 can be initialized in memory associated with the data integrator 1101.

In accordance with an embodiment, this knowledge module 1120, which can utilize the IKM (integration knowledge module) which uses flow table.

In accordance with an embodiment, the CKM can be associated with a number of constraints 1131, a user interface 1132, and a temporary table 1133.

In accordance with an embodiment, once started after an error in the first merge operation 1110, the data to be loaded at the target (e.g., customer schema 164) can be loaded into a temporary table 1133. Once loaded, the CKM can perform checks on the data via the constraints 1131 to remove any erroneous data to the staging table 1121. All valid data that has been checked via with the constraints can be loaded to the target.

In accordance with an embodiment, the CKM, via the incremental update KM 1120, can write a rejection table when inserting valid data into an integration table. The records in the rejection table can then be inserted into the staging table 1121, while the valid data can be loaded into the target at the data warehouse.

In accordance with an embodiment, the incremental update knowledge module, via the CKM, can check and reject a number of different types of data failures, including but not limited to, (a) Primary Key issues (b) Column Length/Datatype issues. The rejected data records are entered into error tables at the staging table.

In accordance with an embodiment, once the valid data has been loaded at the target, the error tables can be discarded after the knowledge module 1120 notifies 1170 the user, via the user interface 1132, of which records were found to be erroneous (and the reason). The user can then attempt to resolve the erroneous records at the source, i.e., 1106, before attempting another ETL.

Figure 12:
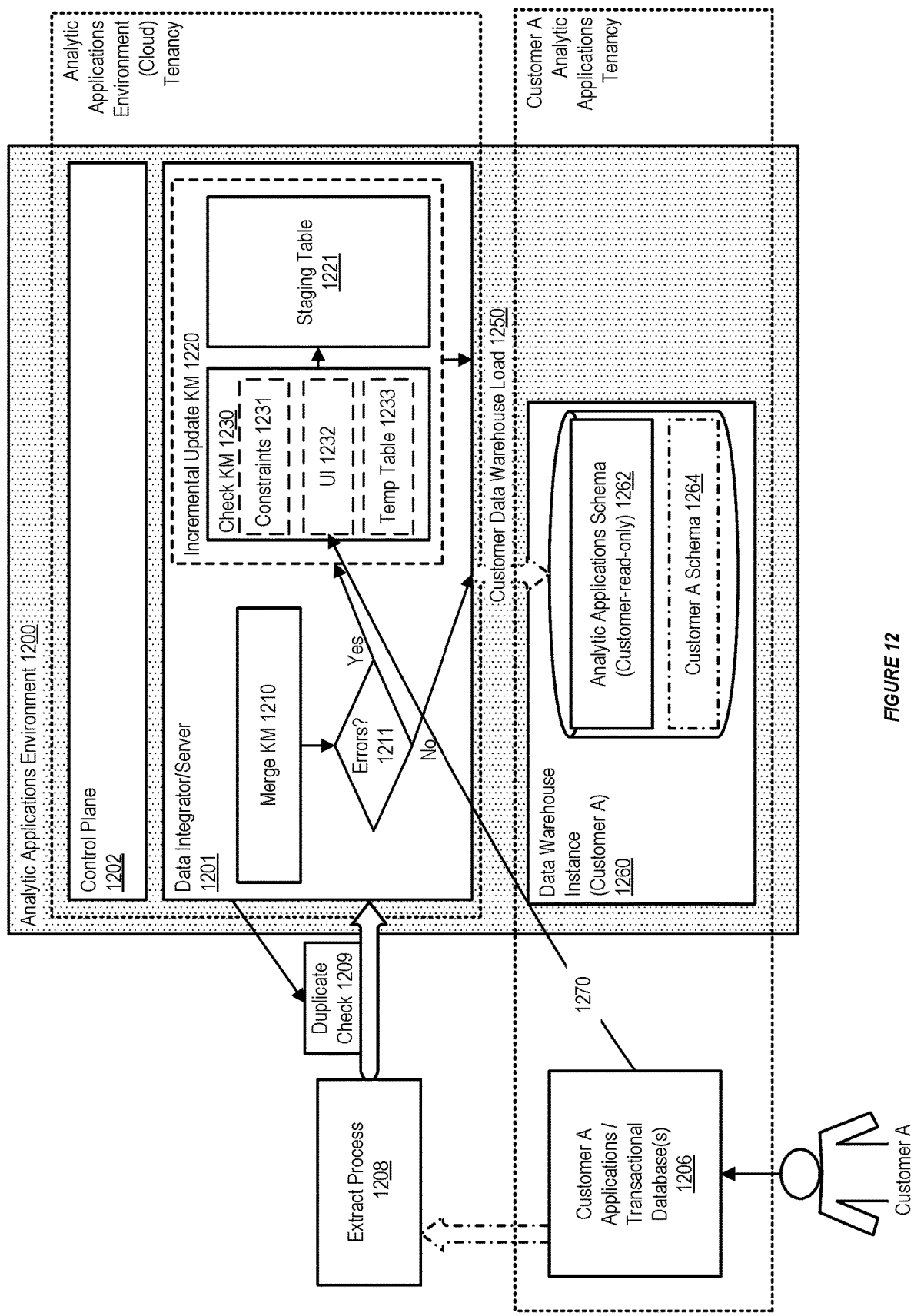
FIG. 12 illustrates a system for automatic correction/rejection in an analytics environment, in accordance with an embodiment.

FIG. 12 illustrates a system for automatic correction/rejection in an analytics environment, in accordance with an embodiment.

As illustrated in FIG. 12, a control plane 1202 provides control, e.g., for cloud products offered within a SaaS environment; and can include a console interface, that enables access by a client (computer) device under control of a customer/tenant; and a provisioning component, as shown in FIG. 1.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

As further illustrated in FIG. 12, a data integrator/server 1201 can be provided at, for example, the data plane as described in FIG. 1. This data integrator can be, in some embodiments, be thought to comprise a data pipeline (e.g., an extract, transform, load (ETL) process and a data transformation layer, which together operate to extract 1208, process, and load 1250 the data to a data warehouse. Such data can include data from operational or transactional data from customer enterprise applications or transaction database environments 1206, e.g., Oracle Fusion Applications environments, into data warehouse instances.

In accordance with an embodiment, the data pipeline maintains, for each customer/tenant (e.g., customer A associated with customer A applications/transactional database 1206), an analytic applications schema 1262, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1206.

In accordance with an embodiment, as such, the analytic applications schema maintained by the system enables data to be retrieved, by the data pipeline, from the customer's environment, and loaded to the customer's data warehouse instance 1260, in a "live" manner; but is otherwise made accessible to customers in a read-only manner, and is not directly modifiable by the customer.

In accordance with an embodiment, the analytic applications environment also provides, for each customer of the environment, a customer schema, such as 1264, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics.

In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

In accordance with an embodiment, the data integrator 1201 can be provided (e.g., within or associated with the data plane of FIG. 1). Such a data integrator can allow users or administrators to create a logical design which is platform and technology independent. Such logical definitions/designs provided a framework for how data can flow from one system to another. Such data integration tools use such frameworks, in conjunction with the infrastructure in place, to create plans for ETL.

In accordance with an embodiment, the data integrator 1201 can be associated with one or more knowledge modules of a plurality of knowledge modules. Knowledge Modules (KMs) can comprise code templates or knowledge models. Each KM can be dedicated to an individual task in an overall data integration process.

In accordance with an embodiment, each KM can be reused across several interfaces or models (e.g., differing types of source and/or target databases or data warehouses). To modify the behavior of hundreds of jobs using hand-coded scripts and procedures, developers would need to modify each script or procedure. In contrast, the benefit of a KM is that users make a change once and it can be instantly propagated to hundreds of transformations. KMs are based on logical tasks that will be performed. KMs do not contain references to physical objects (data stores, columns, physical paths, etc.)

In accordance with an embodiment, KMs rely on metadata from interfaces, data stores, data warehouses and models in order to run.

In accordance with an embodiment, in order to maximize the success rate of the methods and systems described herein, the data integrator 1201 can, at the outset of a ETL, and after the extraction process 1208 from business production application/DB instance 1206 and loading it to a customer schema 1264 at the data warehouse 1260, check for and remove duplicate data entries 1209 that would cause an ETL process to fail. This is generally a lightweight operation.

In accordance with an embodiment, this duplicate record check and removal process performed after extraction can increase the likelihood of success of the initial load performed with knowledge module-merge 1210.

In accordance with an embodiment, if the ETL process is a full load, the system can optionally disable unique constrains on the target table in order to speed up the ETL process. This can be performed as a way of increasing the speed of the initial run. However, the removal of constraints is only performed after the removal of duplicate records at the source so as to prevent duplicate records being loaded to the customer schema at the data warehouse.

In accordance with an embodiment, the data, with duplicates removed, can then be loaded to the customer schema at the data warehouse via a merge operation, which is provided by a knowledge module 1210 that comprises methods to merge the data directly from the source to the target. In embodiments, the merge knowledge module can load the data directly without use of any flow or staging tables.

In accordance with an embodiment, during this initial phase of the ETL process, a staging area/table 1221 is not started or populated with data form the source 1206. This is because the knowledge module merge 1210 does not require such a staging table as it merely transforms data from the source and directly loads it to the target, in this case the customer schema 1264. By removing the necessity of the creating of a staging area/table, such systems and methods improve the efficiency and performance of ETL processes to take data from source DB instance 1206 and load the data at the target, e.g., customer schema 1264.

In accordance with an embodiment, in situations where no errors 1211 result from the knowledge module merge 1210 process, data is merged directly from the source and loaded at the target.

In accordance with an embodiment, however, if an error does present during the ETL process associated with the knowledge module merge 1210, then a secondary knowledge module-incremental update 1220 can be triggered. This is provided for as the data integrator 1201 can support multiple knowledge module schemas that can run concurrently/simultaneously.

In accordance with an embodiment, an error can result during the merge operation due to, for examples, duplicate records that were not caught during the initial check and removal of duplicate records 1209. Another example of an error that could result in the merge 1210 operation failing is a length issue. For example, if the target table at the customer schema comprises a column with a character limitation (e.g., 30 characters), and a data that is attempted to be loaded within the column with the character limitation comprises 32 characters, then an error will result in the merge operation and the data is not committed at the customer schema. Instead, the entire load is backed out to the knowledge module-incremental update 1220.

In accordance with an embodiment, once triggered by an error in the initial load via the knowledge module merge 1210, the knowledge module incremental update 1220 can start and initialize a check knowledge module (CKM) 1230 and temporary table/staging table 1221 can be initialized in memory associated with the data integrator 1201.

In accordance with an embodiment, this knowledge module 1220, which can utilize the IKM (integration knowledge module) which uses flow table.

In accordance with an embodiment, the CKM can be associated with a number of constraints 1231, a user interface 1232, and a temporary table 1233.

In accordance with an embodiment, once started after an error in the first merge operation 1210, the data to be loaded at the target (e.g., customer schema 164) can be loaded into a temporary table 1233. Once loaded, the CKM can perform checks on the data via the constraints 1231 to remove any erroneous data to the staging table 1221. All valid data that has been checked via with the constraints can be loaded to the target.

In accordance with an embodiment, the CKM, via the incremental update KM 1220, can write a rejection table when inserting valid data into an integration table. The records in the rejection table can then be inserted into the staging table 1221, while the valid data can be loaded into the target at the data warehouse.

In accordance with an embodiment, the incremental update knowledge module, via the CKM, can check and reject a number of different types of data failures, including but not limited to, (a) Primary Key issues (b) Column Length/Datatype issues. The rejected data records are entered into error tables at the staging table.

In accordance with an embodiment, once the valid data has been loaded at the target, the error tables can be discarded after the knowledge module 1220 notifies 1270 the user, via the user interface 1232, of which records were found to be erroneous (and the reason). The user can then attempt to resolve the erroneous records at the source, i.e., 1206, before attempting another ETL.

In accordance with another embodiment, once the valid data has been loaded at the target, the system can accept instructions 1270, at the UI, with regard to the error tables that have been populated at the staging table 1221. These instructions can include, for example, instructions to modify the data to attempt to resolve the errors with the erroneous records, via the user interface, before the records at the staging table 1221 are purged.

Figure 13:
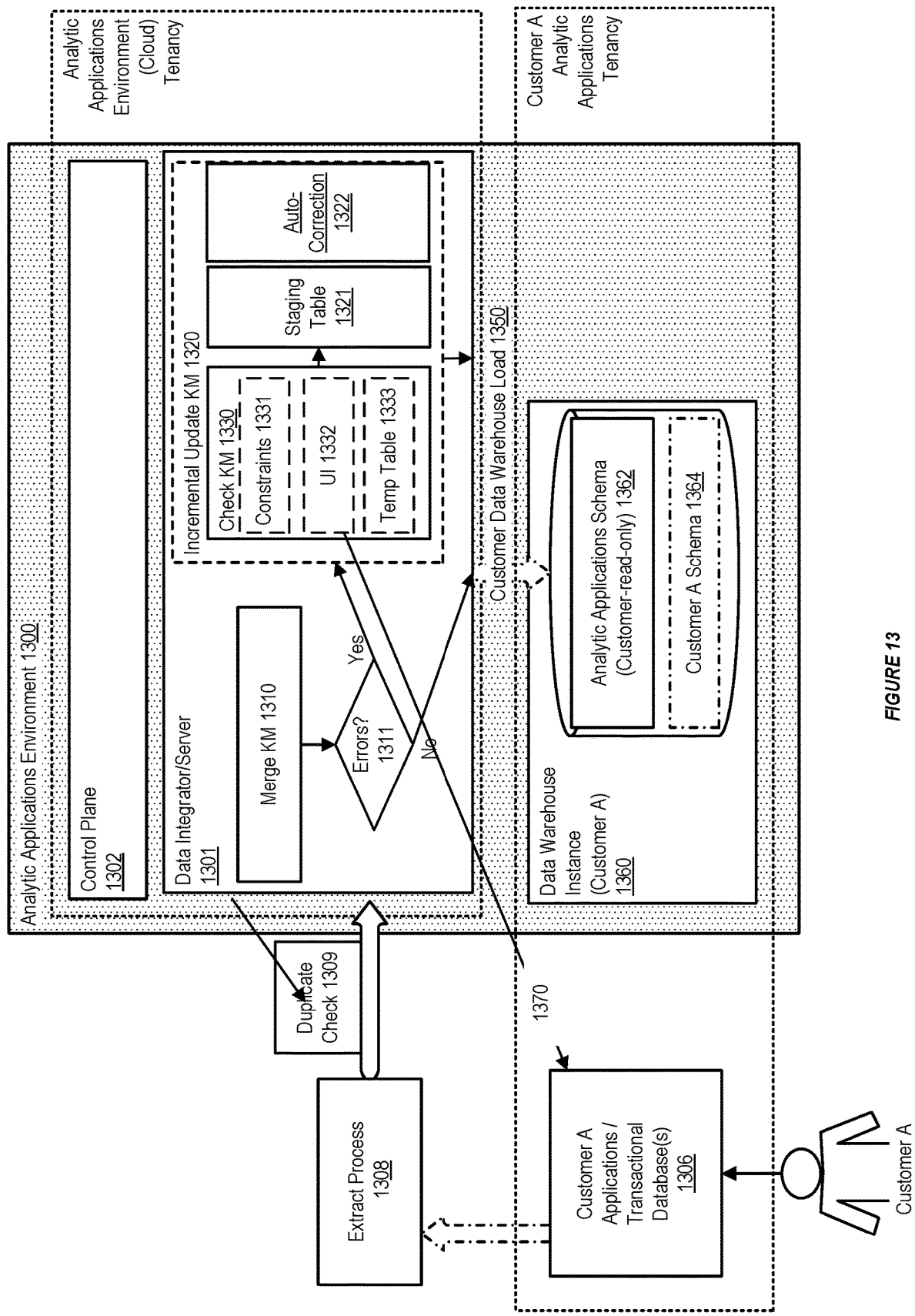
FIG. 13 illustrates a system for automatic correction/rejection in an analytics environment, in accordance with an embodiment.

FIG. 13 illustrates a system for automatic correction/rejection in an analytics environment, in accordance with an embodiment.

As illustrated in FIG. 13, a control plane 1302 provides control, e.g., for cloud products offered within a SaaS environment; and can include a console interface, that enables access by a client (computer) device under control of a customer/tenant; and a provisioning component, as shown in FIG. 1.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

As further illustrated in FIG. 13, a data integrator/server 1301 can be provided at, for example, the data plane as described in FIG. 1. This data integrator can be, in some embodiments, be thought to comprise a data pipeline (e.g., an extract, transform, load (ETL) process and a data transformation layer, which together operate to extract 1308, process, and load 1350 the data to a data warehouse. Such data can include data from operational or transactional data from customer enterprise applications or transaction database environments 1306, e.g., Oracle Fusion Applications environments, into data warehouse instances.

In accordance with an embodiment, the data pipeline maintains, for each customer/tenant (e.g., customer A associated with customer A applications/transactional database 1306), an analytic applications schema 1362, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1306.

In accordance with an embodiment, as such, the analytic applications schema maintained by the system enables data to be retrieved, by the data pipeline, from the customer's environment, and loaded to the customer's data warehouse instance 1360, in a "live" manner; but is otherwise made accessible to customers in a read-only manner, and is not directly modifiable by the customer.

In accordance with an embodiment, the analytic applications environment also provides, for each customer of the environment, a customer schema, such as 1364, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics.

In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

In accordance with an embodiment, the data integrator 1301 can be provided (e.g., within or associated with the data plane of FIG. 1). Such a data integrator can allow users or administrators to create a logical design which is platform and technology independent. Such logical definitions/designs provided a framework for how data can flow from one system to another. Such data integration tools use such frameworks, in conjunction with the infrastructure in place, to create plans for ETL.

In accordance with an embodiment, the data integrator 1301 can be associated with one or more knowledge modules of a plurality of knowledge modules. Knowledge Modules (KMs) can comprise code templates or knowledge models. Each KM can be dedicated to an individual task in an overall data integration process.

In accordance with an embodiment, each KM can be reused across several interfaces or models (e.g., differing types of source and/or target databases or data warehouses). To modify the behavior of hundreds of jobs using hand-coded scripts and procedures, developers would need to modify each script or procedure. In contrast, the benefit of a KM is that users make a change once and it can be instantly propagated to hundreds of transformations. KMs are based on logical tasks that will be performed. KMs do not contain references to physical objects (data stores, columns, physical paths, etc.)

In accordance with an embodiment, KMs rely on metadata from interfaces, data stores, data warehouses and models in order to run.

In accordance with an embodiment, in order to maximize the success rate of the methods and systems described herein, the data integrator 1301 can, at the outset of a ETL, and after the extraction process 1308 from business production application/DB instance 1306 and loading it to a customer schema 1364 at the data warehouse 1360, check for and remove duplicate data entries 1309 that would cause an ETL process to fail. This is generally a lightweight operation.

In accordance with an embodiment, this duplicate record check and removal process performed after extraction can increase the likelihood of success of the initial load performed with knowledge module-merge 1310.

In accordance with an embodiment, if the ETL process is a full load, the system can optionally disable unique constrains on the target table in order to speed up the ETL process. This can be performed as a way of increasing the speed of the initial run. However, the removal of constraints is only performed after the removal of duplicate records at the source so as to prevent duplicate records being loaded to the customer schema at the data warehouse.

In accordance with an embodiment, the data, with duplicates removed, can then be loaded to the customer schema at the data warehouse via a merge operation, which is provided by a knowledge module 1310 that comprises methods to merge the data directly from the source to the target. In embodiments, the merge knowledge module can load the data directly without use of any flow or staging tables.

In accordance with an embodiment, during this initial phase of the ETL process, a staging area/table 1321 is not started or populated with data form the source 1306. This is because the knowledge module merge 1310 does not require such a staging table as it merely transforms data from the source and directly loads it to the target, in this case the customer schema 1364. By removing the necessity of the creating of a staging area/table, such systems and methods improve the efficiency and performance of ETL processes to take data from source DB instance 1306 and load the data at the target, e.g., customer schema 1364.

In accordance with an embodiment, in situations where no errors 1311 result from the knowledge module merge 1310 process, data is merged directly from the source and loaded at the target.

In accordance with an embodiment, however, if an error does present during the ETL process associated with the knowledge module merge 1310, then a secondary knowledge module-incremental update 1320 can be triggered. This is provided for as the data integrator 1301 can support multiple knowledge module schemas that can run concurrently/simultaneously.

In accordance with an embodiment, an error can result during the merge operation due to, for examples, duplicate records that were not caught during the initial check and removal of duplicate records 1309. Another example of an error that could result in the merge 1310 operation failing is a length issue. For example, if the target table at the customer schema comprises a column with a character limitation (e.g., 30 characters), and a data that is attempted to be loaded within the column with the character limitation comprises 32 characters, then an error will result in the merge operation and the data is not committed at the customer schema. Instead, the entire load is backed out to the knowledge module-incremental update 1320.

In accordance with an embodiment, once triggered by an error in the initial load via the knowledge module merge 1310, the knowledge module incremental update 1320 can start and initialize a check knowledge module (CKM) 1330 and temporary table/staging table 1321 can be initialized in memory associated with the data integrator 1301.

In accordance with an embodiment, this knowledge module 1320, which can utilize the IKM (integration knowledge module) which uses flow table.

In accordance with an embodiment, the CKM can be associated with a number of constraints 1331, a user interface 1332, and a temporary table 1333.

In accordance with an embodiment, once started after an error in the first merge operation 1310, the data to be loaded at the target (e.g., customer schema 164) can be loaded into a temporary table 1333. Once loaded, the CKM can perform checks on the data via the constraints 1331 to remove any erroneous data to the staging table 1321. All valid data that has been checked via with the constraints can be loaded to the target.

In accordance with an embodiment, the CKM, via the incremental update KM 1320, can write a rejection table when inserting valid data into an integration table. The records in the rejection table can then be inserted into the staging table 1321, while the valid data can be loaded into the target at the data warehouse.

In accordance with an embodiment, the incremental update knowledge module, via the CKM, can check and reject a number of different types of data failures, including but not limited to, (a) Primary Key issues (b) Column Length/Datatype issues. The rejected data records are entered into error tables at the staging table.

In accordance with an embodiment, once the valid data has been loaded at the target, the error tables can be discarded after the knowledge module 1320 notifies 1370 the user, via the user interface 1332, of which records were found to be erroneous (and the reason). The user can then attempt to resolve the erroneous records at the source, i.e., 1306, before attempting another ETL.

In accordance with another embodiment, once the valid data has been loaded at the target, the system can utilize an auto-correction mechanism 1322 at the knowledge module 1320 whereby the mechanism attempts to automatically correct any erroneous records that are logged in the error table at the staging table 1321. For example, if a record was flagged as having an incorrect character length because the record comprises 32 characters while the constrain for the column is 30 characters, an auto-correction mechanism could trim 2 characters off the end of the record, in which case the error on the record would be resolved and be allowed to be loaded at the target. Logs of such auto-corrections could then be published 1370 to a user, via the user interface 1332.

Figure 14:
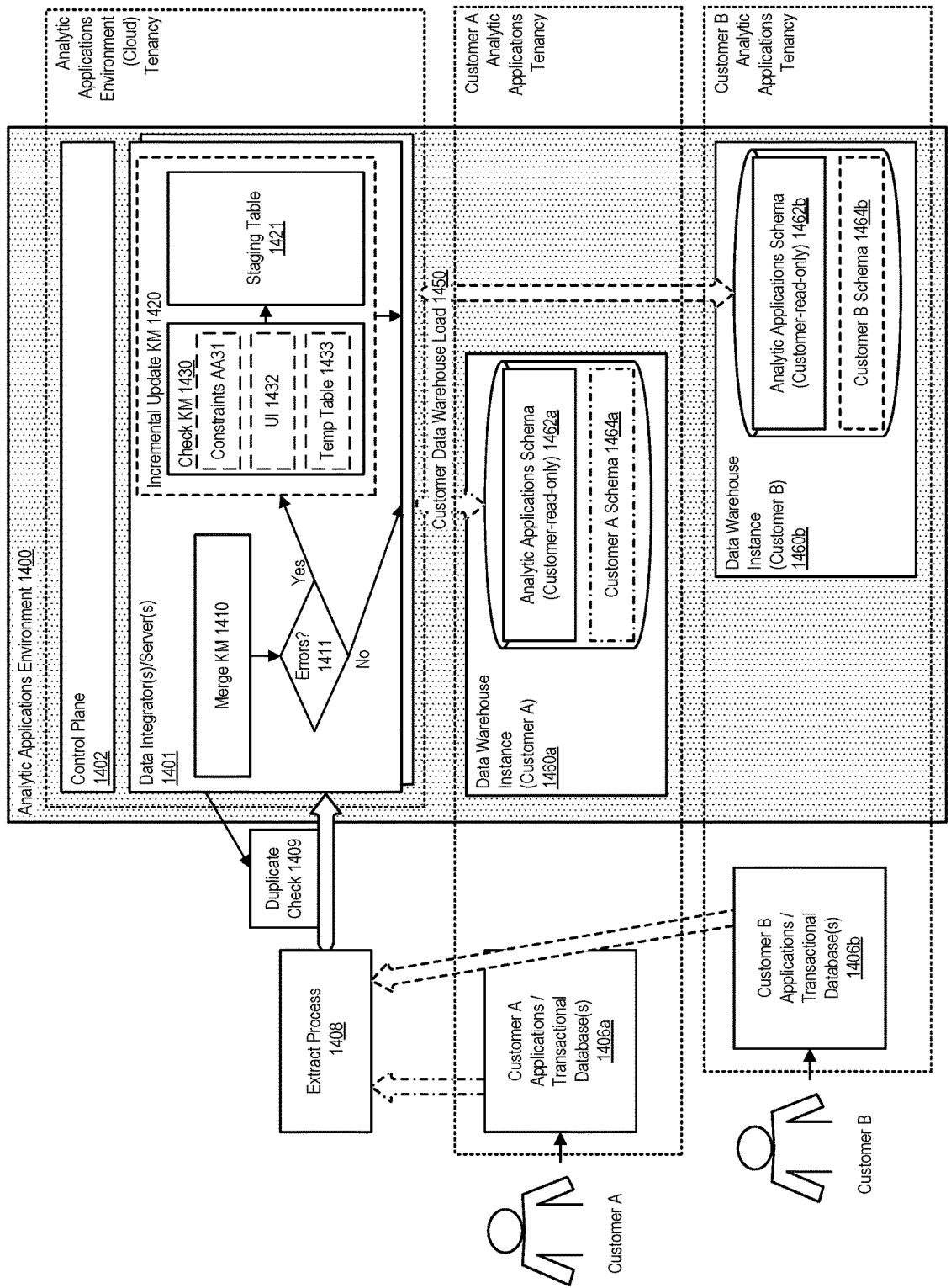
FIG. 14 illustrates a system for automatic correction/rejection in an analytics environment, in accordance with an embodiment.

FIG. 14 illustrates a system for automatic correction/rejection in an analytics environment, in accordance with an embodiment.

As illustrated in FIG. 14, a control plane 1402 provides control, e.g., for cloud products offered within a SaaS environment; and can include a console interface, that enables access by a client (computer) device under control of a customer/tenant; and a provisioning component, as shown in FIG. 1.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

As further illustrated in FIG. 14, a data integrator/server 1401 can be provided at, for example, the data plane as described in FIG. 1. This data integrator can be, in some embodiments, be thought to comprise a data pipeline (e.g., an extract, transform, load (ETL) process and a data transformation layer, which together operate to extract 1408, process, and load 1450 the data to a data warehouse. Such data can include data from operational or transactional data from customer enterprise applications or transaction database environments 1406a and/or 1406b, e.g., Oracle Fusion Applications environments, into data warehouse instances.

In accordance with an embodiment, the data pipeline maintains, for each customer/tenant (e.g., customer A and customer B associated with customer applications/transactional databases 1406a and 1406b, respectively), an analytic applications schema 1462a and 1462b, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1406a and 1406b.

In accordance with an embodiment, as such, the analytic applications schema maintained by the system enables data to be retrieved, by the data pipeline, from the customer's environment, and loaded to the customer's data warehouse instance 1460a and 1460b, respectively, in a "live" manner; but is otherwise made accessible to customers in a read-only manner, and is not directly modifiable by the customer.

In accordance with an embodiment, the analytic applications environment also provides, for each customer of the environment, a customer schema, such as 1464a and 1464b, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics.

In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

In accordance with an embodiment, the data integrator 1401 can be provided (e.g., within or associated with the data plane of FIG. 1). Such a data integrator can allow users or administrators to create a logical design which is platform and technology independent. Such logical definitions/designs provided a framework for how data can flow from one system to another. Such data integration tools use such frameworks, in conjunction with the infrastructure in place, to create plans for ETL.

In accordance with an embodiment, the data integrator 1401 can be associated with one or more knowledge modules of a plurality of knowledge modules. Knowledge Modules (KMs) can comprise code templates or knowledge models. Each KM can be dedicated to an individual task in an overall data integration process.

In accordance with an embodiment, in order to maintain the separation of data and ETLs of different users, multiple instances data integrator 1401 can be provided for on one or more servers. This can be accomplished, for example, via the user of a shared server hardware spinning off multiple instances of a data integrator, where each data integrator comprises a copy/instance of the knowledge modules involved. Alternatively, multiple instances of data integrators can be spun on, one on each server hardware, where each data integrator comprises a copy/instance of the knowledge modules involved.

In accordance with an embodiment, each KM can be reused across several interfaces or models (e.g., differing types of source and/or target databases or data warehouses). To modify the behavior of hundreds of jobs using hand-coded scripts and procedures, developers would need to modify each script or procedure. In contrast, the benefit of a KM is that users make a change once and it can be instantly propagated to hundreds of transformations. KMs are based on logical tasks that will be performed. KMs do not contain references to physical objects (data stores, columns, physical paths, etc.)

In accordance with an embodiment, KMs rely on metadata from interfaces, data stores, data warehouses and models in order to run.

In accordance with an embodiment, in order to maximize the success rate of the methods and systems described herein, the data integrator 1401 can, at the outset of a ETL, and after the extraction process 1408 from business production application/DB instance 1406a and/or 1406b and loading it to a customer schema 1464a and/or 1464b at the respective instances of data warehouse 1460a and 1460b, check for and remove duplicate data entries 1409 that would cause an ETL process to fail. This is generally a lightweight operation.

In accordance with an embodiment, this duplicate record check and removal process performed after extraction can increase the likelihood of success of the initial load performed with knowledge module-merge 1410.

In accordance with an embodiment, if the ETL process is a full load, the system can optionally disable unique constrains on the target table in order to speed up the ETL process. This can be performed as a way of increasing the speed of the initial run. However, the removal of constraints is only performed after the removal of duplicate records at the source so as to prevent duplicate records being loaded to the customer schema at the data warehouse.

In accordance with an embodiment, the data, with duplicates removed, can then be loaded to the customer schema at the data warehouse via a merge operation, which is provided by a knowledge module 1410 that comprises methods to merge the data directly from the source to the target. In embodiments, the merge knowledge module can load the data directly without use of any flow or staging tables.

In accordance with an embodiment, during this initial phase of the ETL process, a staging area/table 1421 is not started or populated with data form the source 1406a and/or 1406b. This is because the knowledge module merge 1410 does not require such a staging table as it merely transforms data from the source and directly loads it to the target, in this case the customer schema 1464a and/or 1464b. By removing the necessity of the creating of a staging area/table, such systems and methods improve the efficiency and performance of ETL processes to take data from source DB instance 1406a and/or 1406b and load the data at the target, e.g., customer schema 1464a and/or 1464b.

In accordance with an embodiment, in situations where no errors 1411 result from the knowledge module merge 1410 process, data is merged directly from the source and loaded at the target.

In accordance with an embodiment, however, if an error does present during the ETL process associated with the knowledge module merge 1410, then a secondary knowledge module-incremental update 1420 can be triggered. This is provided for as the data integrator 1401 can support multiple knowledge module schemas that can run concurrently/simultaneously.

In accordance with an embodiment, an error can result during the merge operation due to, for examples, duplicate records that were not caught during the initial check and removal of duplicate records 1409. Another example of an error that could result in the merge 1410 operation failing is a length issue. For example, if the target table at the customer schema comprises a column with a character limitation (e.g., 30 characters), and a data that is attempted to be loaded within the column with the character limitation comprises 32 characters, then an error will result in the merge operation and the data is not committed at the customer schema. Instead, the entire load is backed out to the knowledge module-incremental update 1420.

In accordance with an embodiment, once triggered by an error in the initial load via the knowledge module merge 1410, the knowledge module incremental update 1420 can start and initialize a check knowledge module (CKM) 1430 and temporary table/staging table 1421 can be initialized in memory associated with the data integrator 1401.

In accordance with an embodiment, this knowledge module 1420, which can utilize the IKM (integration knowledge module) which uses flow table.

In accordance with an embodiment, the CKM can be associated with a number of constraints 1431, a user interface 1432, and a temporary table 1433.

In accordance with an embodiment, once started after an error in the first merge operation 1410, the data to be loaded at the target (e.g., customer schema 164) can be loaded into a temporary table 1433. Once loaded, the CKM can perform checks on the data via the constraints 1431 to remove any erroneous data to the staging table 1421. All valid data that has been checked via with the constraints can be loaded to the target.

In accordance with an embodiment, the CKM, via the incremental update KM 1420, can write a rejection table when inserting valid data into an integration table. The records in the rejection table can then be inserted into the staging table 1421, while the valid data can be loaded into the target at the data warehouse.

In accordance with an embodiment, the incremental update knowledge module, via the CKM, can check and reject a number of different types of data failures, including but not limited to, (a) Primary Key issues (b) Column Length/Datatype issues. The rejected data records are entered into error tables at the staging table.

Figure 15:
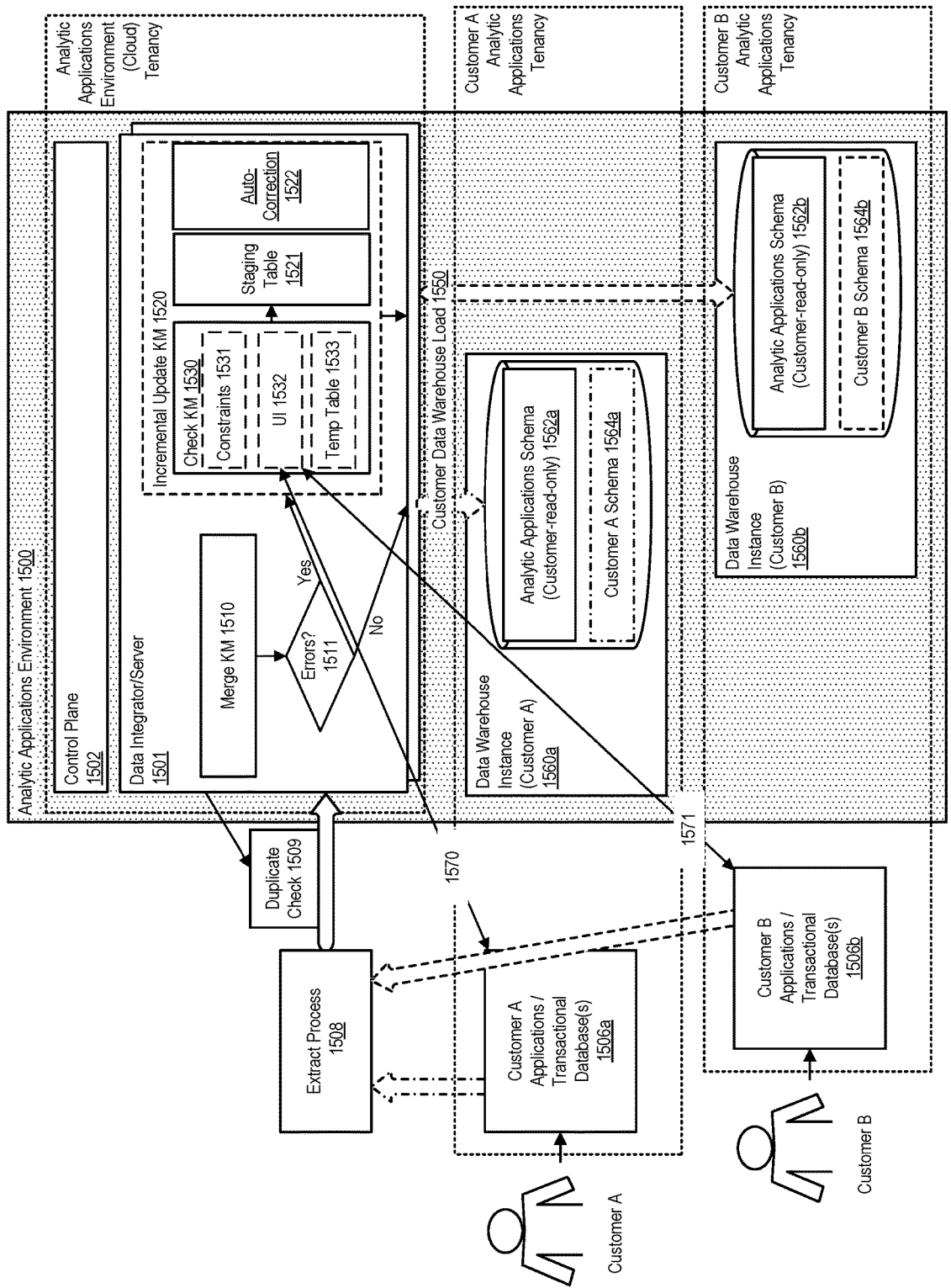
FIG. 15 illustrates a system for automatic correction/rejection in an analytics environment, in accordance with an embodiment.

FIG. 15 illustrates a system for automatic correction/rejection in an analytics environment, in accordance with an embodiment.

As illustrated in FIG. 15, a control plane 1502 provides control, e.g., for cloud products offered within a SaaS environment; and can include a console interface, that enables access by a client (computer) device under control of a customer/tenant; and a provisioning component, as shown in FIG. 1.

In accordance with an embodiment, for example, a customer can request a provisioning of a data warehouse instance. The provisioning component can then provision the requested data warehouse instance (including a customer schema); and populate the warehouse with the necessary information supplied by the customer. This can represent, for example, part of a PaaS component.

As further illustrated in FIG. 15, a data integrator/server 1501 can be provided at, for example, the data plane as described in FIG. 1. This data integrator can be, in some embodiments, be thought to comprise a data pipeline (e.g., an extract, transform, load (ETL) process and a data transformation layer, which together operate to extract 1508, process, and load 1550 the data to a data warehouse. Such data can include data from operational or transactional data from customer enterprise applications or transaction database environments 1506a and/or 1506b, e.g., Oracle Fusion Applications environments, into data warehouse instances.

In accordance with an embodiment, the data pipeline maintains, for each customer/tenant (e.g., customer A and customer B associated with customer applications/transactional databases 1506a and 1506b, respectively), an analytic applications schema 1562a and 1562b, e.g., as a star schema, that is periodically updated (e.g., hourly/daily/weekly) by the system in accordance with best practices for a particular analytic use case, e.g., human capital management (HCM) analytics, or enterprise resource planning (ERP) analytics.

In accordance with an embodiment, the data transformation layer can include a data model (e.g., a knowledge model, KM, or other type of data model) that the system uses to transform the transactional data received from the enterprise or business application, into a model format, for loading into the data warehouse.

In accordance with an embodiment, for each customer, the system uses the analytic applications schema, that is maintained and updated by the system, to pre-populate a data warehouse instance for the customer, based on an analysis of the data within that customer's enterprise applications environment, e.g., 1506a and 1506b.

In accordance with an embodiment, as such, the analytic applications schema maintained by the system enables data to be retrieved, by the data pipeline, from the customer's environment, and loaded to the customer's data warehouse instance 1560a and 1560b, respectively, in a "live" manner; but is otherwise made accessible to customers in a read-only manner, and is not directly modifiable by the customer.

In accordance with an embodiment, the analytic applications environment also provides, for each customer of the environment, a customer schema, such as 1564a and 1564b, that is readily modifiable by the customer, and which allows the customer to supplement and utilize the data within their own data warehouse instance.

In accordance with an embodiment, for each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics.

In accordance with an embodiment, for example, a data warehouse (e.g., an Oracle Autonomous Data Warehouse, ADWC) can include a default analytic applications schema (analytic warehouse schema) and, for each customer/tenant, a customer schema sourced from their enterprise applications component. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area.

In accordance with an embodiment, the data integrator 1501 can be provided (e.g., within or associated with the data plane of FIG. 1). Such a data integrator can allow users or administrators to create a logical design which is platform and technology independent. Such logical definitions/designs provided a framework for how data can flow from one system to another. Such data integration tools use such frameworks, in conjunction with the infrastructure in place, to create plans for ETL.

In accordance with an embodiment, the data integrator 1501 can be associated with one or more knowledge modules of a plurality of knowledge modules. Knowledge Modules (KMs) can comprise code templates or knowledge models. Each KM can be dedicated to an individual task in an overall data integration process.

In accordance with an embodiment, in order to maintain the separation of data and ETLs of different users, multiple instances data integrator 1501 can be provided for on one or more servers. This can be accomplished, for example, via the user of a shared server hardware spinning off multiple instances of a data integrator, where each data integrator comprises a copy/instance of the knowledge modules involved. Alternatively, multiple instances of data integrators can be spun on, one on each server hardware, where each data integrator comprises a copy/instance of the knowledge modules involved.

In accordance with an embodiment, each KM can be reused across several interfaces or models (e.g., differing types of source and/or target databases or data warehouses). To modify the behavior of hundreds of jobs using hand-coded scripts and procedures, developers would need to modify each script or procedure. In contrast, the benefit of a KM is that users make a change once and it can be instantly propagated to hundreds of transformations. KMs are based on logical tasks that will be performed. KMs do not contain references to physical objects (data stores, columns, physical paths, etc.)

In accordance with an embodiment, KMs rely on metadata from interfaces, data stores, data warehouses and models in order to run.

In accordance with an embodiment, in order to maximize the success rate of the methods and systems described herein, the data integrator 1501 can, at the outset of a ETL, and after the extraction process 1508 from business production application/DB instance 1506a and/or 1506b and loading it to a customer schema 1564a and/or 1564b at the respective instances of data warehouse 1560a and 1560b, check for and remove duplicate data entries 1509 that would cause an ETL process to fail. This is generally a lightweight operation.

In accordance with an embodiment, this duplicate record check and removal process performed after extraction can increase the likelihood of success of the initial load performed with knowledge module-merge 1510.

In accordance with an embodiment, if the ETL process is a full load, the system can optionally disable unique constrains on the target table in order to speed up the ETL process. This can be performed as a way of increasing the speed of the initial run. However, the removal of constraints is only performed after the removal of duplicate records at the source so as to prevent duplicate records being loaded to the customer schema at the data warehouse.

In accordance with an embodiment, the data, with duplicates removed, can then be loaded to the customer schema at the data warehouse via a merge operation, which is provided by a knowledge module 1510 that comprises methods to merge the data directly from the source to the target. In embodiments, the merge knowledge module can load the data directly without use of any flow or staging tables.

In accordance with an embodiment, during this initial phase of the ETL process, a staging area/table 1521 is not started or populated with data form the source 1506a and/or 1506b. This is because the knowledge module merge 1510 does not require such a staging table as it merely transforms data from the source and directly loads it to the target, in this case the customer schema 1564a and/or 1564b. By removing the necessity of the creating of a staging area/table, such systems and methods improve the efficiency and performance of ETL processes to take data from source DB instance 1506a and/or 1506b and load the data at the target, e.g., customer schema 1564a and/or 1564b.

In accordance with an embodiment, in situations where no errors 1511 result from the knowledge module merge 1510 process, data is merged directly from the source and loaded at the target.

In accordance with an embodiment, however, if an error does present during the ETL process associated with the knowledge module merge 1510, then a secondary knowledge module-incremental update 1520 can be triggered. This is provided for as the data integrator 1501 can support multiple knowledge module schemas that can run concurrently/simultaneously.

In accordance with an embodiment, an error can result during the merge operation due to, for examples, duplicate records that were not caught during the initial check and removal of duplicate records 1509. Another example of an error that could result in the merge 1510 operation failing is a length issue. For example, if the target table at the customer schema comprises a column with a character limitation (e.g., 30 characters), and a data that is attempted to be loaded within the column with the character limitation comprises 32 characters, then an error will result in the merge operation and the data is not committed at the customer schema. Instead, the entire load is backed out to the knowledge module-incremental update 1520.

In accordance with an embodiment, once triggered by an error in the initial load via the knowledge module merge 1510, the knowledge module incremental update 1520 can start and initialize a check knowledge module (CKM) 1530 and temporary table/staging table 1521 can be initialized in memory associated with the data integrator 1501.

In accordance with an embodiment, this knowledge module 1520, which can utilize the IKM (integration knowledge module) which uses flow table.

In accordance with an embodiment, the CKM can be associated with a number of constraints 1531, a user interface 1532, and a temporary table 1533.

In accordance with an embodiment, once started after an error in the first merge operation 1510, the data to be loaded at the target (e.g., customer schema 164) can be loaded into a temporary table 1533. Once loaded, the CKM can perform checks on the data via the constraints 1531 to remove any erroneous data to the staging table 1521. All valid data that has been checked via with the constraints can be loaded to the target.

In accordance with an embodiment, the CKM, via the incremental update KM 1520, can write a rejection table when inserting valid data into an integration table. The records in the rejection table can then be inserted into the staging table 1521, while the valid data can be loaded into the target at the data warehouse.

In accordance with an embodiment, the incremental update knowledge module, via the CKM, can check and reject a number of different types of data failures, including but not limited to, (a) Primary Key issues (b) Column Length/Datatype issues. The rejected data records are entered into error tables at the staging table.

In accordance with an embodiment, once the valid data has been loaded at the target, the error tables can be discarded after the knowledge module 1520 notifies 1570/71 the user, via the user interface 1532, of which records were found to be erroneous (and the reason). The user can then attempt to resolve the erroneous records at the source, i.e., 1506a/b, before attempting another ETL.

In accordance with another embodiment, once the valid data has been loaded at the target, the system can accept instructions 1570/71, at the UI, with regard to the error tables that have been populated at the staging table 1521. These instructions can include, for example, instructions to modify the data to attempt to resolve the errors with the erroneous records, via the user interface, before the records at the staging table 1521 are purged.

In accordance with another embodiment, once the valid data has been loaded at the target, the system can utilize an auto-correction mechanism 1522 at the knowledge module 1520 whereby the mechanism attempts to automatically correct any erroneous records that are logged in the error table at the staging table 1521. For example, if a record was flagged as having an incorrect character length because the record comprises 32 characters while the constrain for the column is 30 characters, an auto-correction mechanism could trim 2 characters off the end of the record, in which case the error on the record would be resolved and be allowed to be loaded at the target. Logs of such auto-corrections could then be published 1570/1571 to a user, via the user interface 1532.

Figure 16:
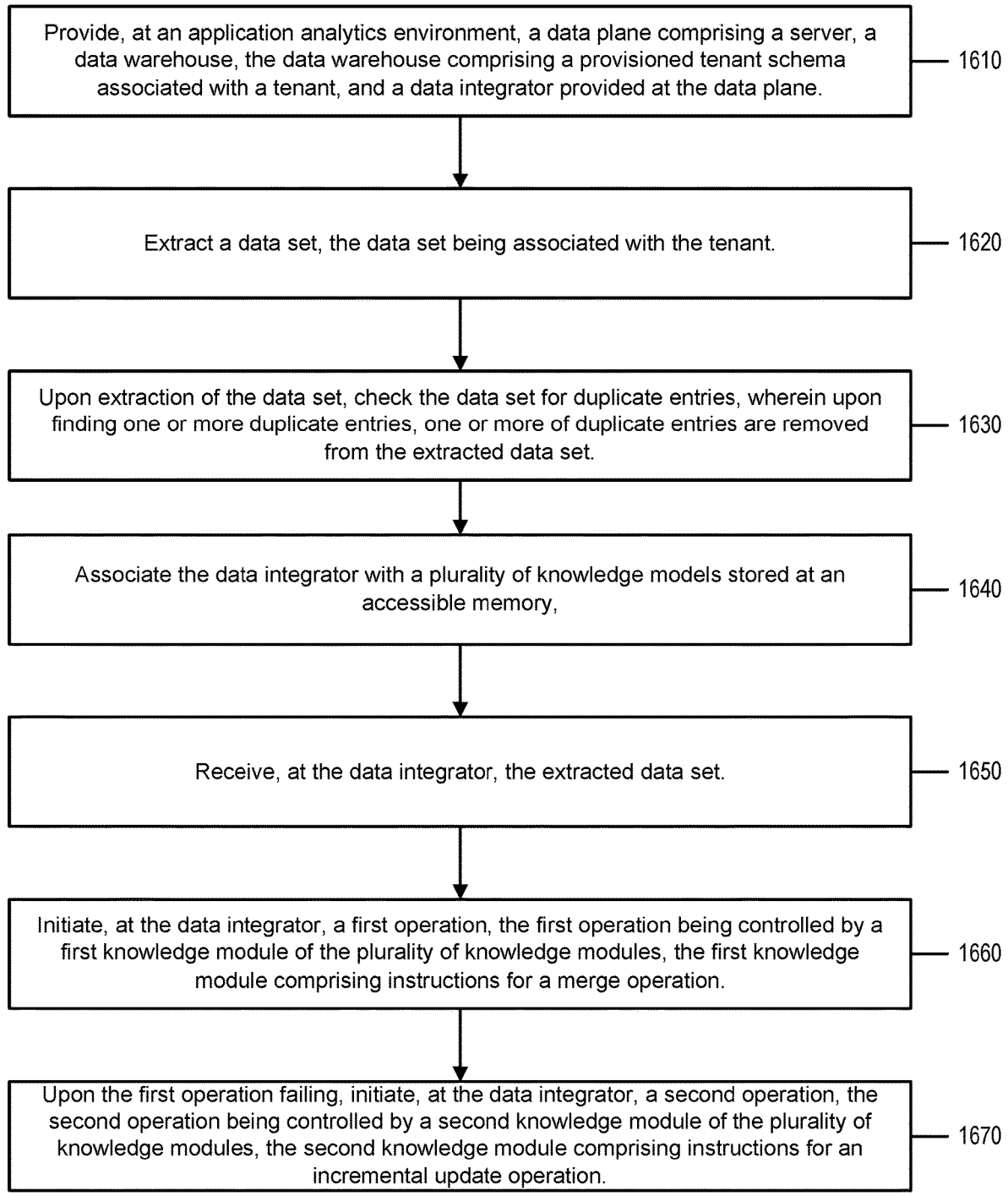
FIG. 16 is a flowchart of a method for automatic rejection of extract, transform, load (ETL) process in an analytics application environment, in accordance with an embodiment.

FIG. 16 is a flowchart of a method for automatic rejection of extract, transform, load (ETL) process in an analytics application environment, in accordance with an embodiment.

In accordance with an embodiment, at step 1610, the method can provide, at an application analytics environment, a data plane comprising a server, a data warehouse, the data warehouse comprising a provisioned tenant schema associated with a tenant, and a data integrator provided at the data plane.

In accordance with an embodiment, at step 1620, the method can extract a data set, the data set being associated with the tenant.

In accordance with an embodiment, at step 1630, the method can upon extraction of the data set, check the data set for duplicate entries, wherein upon finding one or more duplicate entries, one or more of duplicate entries are removed from the extracted data set.

In accordance with an embodiment, at step 1640, the method can associate the data integrator with a plurality of knowledge models stored at an accessible memory.

In accordance with an embodiment, at step 1650, the method can receive, at the data integrator, the extracted data set.

In accordance with an embodiment, at step 1660, the method can initiate, at the data integrator, a first operation, the first operation being controlled by a first knowledge module of the plurality of knowledge modules, the first knowledge module comprising instructions for a merge operation.

In accordance with an embodiment, at step 1670, the method can upon the first operation failing, initiate, at the data integrator, a second operation, the second operation being controlled by a second knowledge module of the plurality of knowledge modules, the second knowledge module comprising instructions for an incremental update operation.

In accordance with an embodiment, each of the plurality of knowledge models can comprise metadata instructions, wherein the metadata instructions of the first knowledge module comprise instructions to perform the merge operation.

In accordance with an embodiment, the metadata instructions of the second knowledge module can comprise instructions to perform the incremental update operation.

In accordance with an embodiment, instructions to perform the merge operation can cause the data integrator to perform an ETL process that directly merges the extracted data set to the provisioned tenant schema associated with the tenant at the data warehouse.

In accordance with an embodiment, the metadata instructions to perform the incremental update can include instructions that cause the data integrator to initiate and provision a staging table accessible by the data integrator.

In accordance with an embodiment, the metadata instructions to perform the incremental update can include further instructions that cause the data integrator to transfer the extracted data set to a temporary table.

In accordance with an embodiment, the metadata instructions to perform the incremental update can include further instructions that cause the data integrator to check the extracted data set at the temporary table against a constraints field.

In accordance with an embodiment, the metadata instructions to perform the incremental update can include further instructions that cause the data integrator to remove to the staging table any member of the extracted data set that fails check against the constraints filed.

In accordance with an embodiment, the metadata instructions to perform the incremental update can include further instructions that cause the data integrator to commit to the provisioned tenant schema at the data warehouse other member of the extracted data set that passes the check against the constraints field to the target.

In accordance with an embodiment, the metadata instructions to perform the incremental update can include further instructions that cause the data integrator to accept inputs indicative of instructions to correct a member of the extracted data set at the staging table.

In accordance with an embodiment, upon correcting the member of the extracted data set at the staging table, the metadata instructions to perform the incremental update can include further instructions that cause the data integrator to commit to the provisioned tenant schema at the data warehouse the corrected member of the extracted data set.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for automatic rejection of extract, transform, load (ETL) process in an analytics application environment, comprising:
    an application analytics environment;
    a data plane comprising a server;
    a data warehouse, the data warehouse comprising a provisioned tenant schema associated with a tenant; and
    a data integrator provided at the data plane;
    wherein a data set is extracted, the data set being associated with the tenant;
    wherein upon extraction of the data set from a database, the data set is checked for duplicate entries, wherein upon finding one or more duplicate entries, one or more of duplicate entries are removed from the extracted data set;
    wherein the data integrator is associated with a plurality of knowledge models stored at an accessible memory;
    wherein the data integrator receives the extracted data set and initiates a first operation, the first operation being controlled by a first knowledge module of the plurality of knowledge modules, the first knowledge module comprising instructions for a merge operation;
    wherein upon the first operation failing in response to an error in an initial load via the first knowledge module, the data integrator initiates a second operation, the second operation being controlled by a second knowledge module of the plurality of knowledge modules, the second knowledge module comprising instructions for an incremental update operation that initializes a check knowledge module (CKM) and a staging table in the memory associated with the data integrator; and
    wherein the CKM writes a rejection table when inserting valid data into an integration table, such that records in the rejection table are inserted into the staging table while the valid data is loaded into a target at the data warehouse.

2. The system of claim 1,
    wherein each of the plurality of knowledge models comprises metadata instructions, wherein the metadata instructions of one or more of the knowledge models is used by the first knowledge module comprise instructions to perform the merge operation.

3. The system of claim 2,
    wherein the metadata instructions of one or more of the knowledge models is used by the second knowledge module comprise instructions to perform the incremental update operation.

4. The system of claim 3,
    wherein the metadata instructions to perform the merge operation cause the data integrator to perform an ETL process that directly merges the extracted data set to the provisioned tenant schema associated with the tenant at the data warehouse, wherein a plurality of knowledge module schemas are configured to run concurrently, and wherein further in response to the error, data is not committed at a customer schema and an entire data load is backed out to a knowledge module-incremental update that performs the incremental update operation.

5. The system of claim 4,
    wherein the metadata instructions to perform the incremental update include instructions that cause the data integrator to initiate and provision the staging table accessible by the data integrator;
    wherein the metadata instructions to perform the incremental update include further instructions that cause the data integrator to transfer the extracted data set to a temporary table.

6. The system of claim 5,
    wherein the metadata instructions to perform the incremental update include further instructions that cause the data integrator to check the extracted data set at the temporary table against a constraints field;
    wherein the metadata instructions to perform the incremental update include further instructions that cause the data integrator to remove to the staging table any member of the extracted data set that fails check against the constraints filed; and
    wherein the metadata instructions to perform the incremental update include further instructions that cause the data integrator to commit to the provisioned tenant schema at the data warehouse other member of the extracted data set that passes the check against the constraints field to the target.

7. The system of claim 6,
    wherein the metadata instructions to perform the incremental update include further instructions that cause the data integrator to accept inputs indicative of instructions to correct a member of the extracted data set at the staging table;
    wherein upon correcting the member of the extracted data set at the staging table, the metadata instructions to perform the incremental update include further instructions that cause the data integrator to commit to the provisioned tenant schema at the data warehouse the corrected member of the extracted data set.

8. A method for automatic rejection of extract, transform, load (ETL) process in an analytics application environment, comprising:
    providing, at an application analytics environment;
    a data plane comprising a server, a data warehouse, the data warehouse comprising a provisioned tenant schema associated with a tenant, and a data integrator provided at the data plane;

extracting a data set, the data set being associated with the tenant;

upon extraction of the data set, checking the data set for duplicate entries, wherein upon finding one or more duplicate entries, one or more of duplicate entries are removed from the extracted data set;

associating the data integrator with a plurality of knowledge models stored at an accessible memory;

receiving, at the data integrator, the extracted data set;

initiating, at the data integrator, a first operation, the first operation being controlled by a first knowledge module of the plurality of knowledge modules, the first knowledge module comprising instructions for a merge operation;

upon the first operation failing in response to an error and an initial load via the first knowledge module, initiating, at the data integrator, a second operation, the second operation being controlled by a second knowledge module of the plurality of knowledge modules, the second knowledge module comprising instructions for an incremental update operation that initializes a check knowledge module (CKM) and a staging table in the memory associated with the data integrator; and writing, using the CKM, a rejection table when inserting valid data into an integration table, such that records in the rejection table are inserted into the staging table while the valid data is loaded into a target at the data warehouse.

9. The method of claim 8, wherein each of the plurality of knowledge models comprises metadata instructions, wherein the metadata instructions of one or more of the knowledge models is used by the first knowledge module comprise instructions to perform the merge operation.

10. The method of claim 9, wherein the metadata instructions of one or more of the knowledge models is used by the second knowledge module comprise instructions to perform the incremental update operation.

11. The method of claim 10, wherein the metadata instructions to perform the merge operation cause the data integrator to perform an ETL process that directly merges the extracted data set to the provisioned tenant schema associated with the tenant at the data warehouse.

12. The method of claim 11, wherein the metadata instructions to perform the incremental update include instructions that cause the data integrator to initiate and provision the staging table accessible by the data integrator;

wherein the metadata instructions to perform the incremental update include further instructions that cause the data integrator to transfer the extracted data set to a temporary table.

13. The method of claim 12, wherein the metadata instructions to perform the incremental update include further instructions that cause the data integrator to check the extracted data set at the temporary table against a constraints field;

wherein the metadata instructions to perform the incremental update include further instructions that cause the data integrator to remove to the staging table any member of the extracted data set that fails check against the constraints filed; and wherein the metadata instructions to perform the incremental update include further instructions that cause the data integrator to commit to the provisioned tenant schema at the data warehouse other member of the extracted data set that passes the check against the constraints field to the target.

14. The method of claim 13, wherein the metadata instructions to perform the incremental update include further instructions that cause the data integrator to accept inputs indicative of instructions to correct a member of the extracted data set at the staging table;

wherein upon correcting the member of the extracted data set at the staging table, the metadata instructions to perform the incremental update include further instructions that cause the data integrator to commit to the provisioned tenant schema at the data warehouse the corrected member of the extracted data set.

15. A non-transitory computer readable storage medium having instructions thereon for automatic rejection of extract, transform, load (ETL) process in an analytics application environment, which when read and executed cause a computer to perform steps comprising:

providing, at an application analytics environment;
a data plane comprising a server,
a data warehouse, the data warehouse comprising a provisioned tenant schema associated with a tenant, and
a data integrator provided at the data plane;

extracting a data set, the data set being associated with the tenant;

upon extraction of the data set, checking the data set for duplicate entries, wherein upon finding one or more duplicate entries, one or more of duplicate entries are removed from the extracted data set;

associating the data integrator with a plurality of knowledge models stored at an accessible memory;

receiving, at the data integrator, the extracted data set;

initiating, at the data integrator, a first operation, the first operation being controlled by a first knowledge module of the plurality of knowledge modules, the first knowledge module comprising instructions for a merge operation;

upon the first operation failing in response to an error in an initial load via the first knowledge module, initiating, at the data integrator, a second operation, the second operation being controlled by a second knowledge module of the plurality of knowledge modules, the second knowledge module comprising instructions for an incremental update operation that initializes a check knowledge module (CKM) and a staging table in the memory associated with the data integrator; and writing, using the CKM, a rejection table when inserting valid data into an integration table, such that records in the rejection table are inserted into the staging table while the valid data is loaded into a target at the data warehouse.

16. The non-transitory computer readable storage medium of claim 15, wherein each of the plurality of knowledge models comprises metadata instructions, wherein the metadata instructions of one or more of the knowledge models is used by the first knowledge module comprise instructions to perform the merge operation; and wherein the metadata instructions of the second knowledge module comprise instructions to perform the incremental update operation.

17. The non-transitory computer readable storage medium of claim 16,
wherein the metadata instructions of one or more of the knowledge models is used by perform the merge operation cause the data integrator to perform an ETL process that directly merges the extracted data set to the provisioned tenant schema associated with the tenant at the data warehouse.

18. The non-transitory computer readable storage medium of claim 17,
wherein the metadata instructions to perform the incremental update include instructions that cause the data integrator to initiate and provision the staging table accessible by the data integrator;
wherein the metadata instructions to perform the incremental update include further instructions that cause the data integrator to transfer the extracted data set to a temporary table.

19. The non-transitory computer readable storage medium of claim 18,
wherein the metadata instructions to perform the incremental update include further instructions that cause the data integrator to check the extracted data set at the temporary table against a constraints field;
wherein the metadata instructions to perform the incremental update include further instructions that cause the data integrator to remove to the staging table any member of the extracted data set that fails check against the constraints filed; and
wherein the metadata instructions to perform the incremental update include further instructions that cause the data integrator to commit to the provisioned tenant schema at the data warehouse other member of the extracted data set that passes the check against the constraints field to the target.

20. The non-transitory computer readable storage medium of claim 19,
wherein the metadata instructions to perform the incremental update include further instructions that cause the data integrator to accept inputs indicative of instructions to correct a member of the extracted data set at the staging table;
wherein upon correcting the member of the extracted data set at the staging table, the metadata instructions to perform the incremental update include further instructions that cause the data integrator to commit to the provisioned tenant schema at the data warehouse the corrected member of the extracted data set.

* * * * *

UNITED STATES PATENT AND TRADEMARK OFFICE
CERTIFICATE OF CORRECTION

| | | |
|---|---|---|
| PATENT NO. | : 11,573,974 B2 | Page 1 of 2 |
| APPLICATION NO. | : 16/852065 | |
| DATED | : February 7, 2023 | |
| INVENTOR(S) | : Vasireddy et al. | |

It is certified that error appears in the above-identified patent and that said Letters Patent is hereby corrected as shown below:

On the Title Page

Item (54) delete "Analysis" and insert -- Analytics --, therefor.

Column 2, under Other Publications, Line 1, delete "Middlewear" and insert -- Middleware --, therefor.

Column 2, under Other Publications, Line 3, delete "Middlewear" and insert -- Middleware --, therefor.

Column 2, under Other Publications, Line 6, delete "/middlewear/" and insert -- /middleware/ --, therefor.

In the Drawings

On sheet 16 of 16, in FIGURE 16, under Reference Numeral 1640, Line 2, delete "memory," and insert -- memory. --, therefor.

In the Specification

In Column 1, Line 3, under Title, delete "Analysis" and insert -- Analytics --, therefor.

In Column 5, Line 48, delete "organization," and insert -- organization. --, therefor.

In Column 11, Line 14, delete "analytics" and insert -- analytics. --, therefor.

In Column 13, Line 56, delete "ETL/ /status" and insert -- ETL/status --, therefor.

In Column 17, Line 23, delete "etc.)" and insert -- etc.). --, therefor.

Signed and Sealed this
Nineteenth Day of December, 2023

*Katherine Kelly Vidal*
Katherine Kelly Vidal
*Director of the United States Patent and Trademark Office*

CERTIFICATE OF CORRECTION (continued)
U.S. Pat. No. 11,573,974 B2

In Column 20, Line 48, delete "etc.)" and insert -- etc.). --, therefor.

In Column 24, Line 13, delete "etc.)" and insert -- etc.). --, therefor.

In Column 27, Line 67, delete "etc.)" and insert -- etc.). --, therefor.

In Column 31, Line 34, delete "etc.)" and insert -- etc.). --, therefor.